United States Patent
Sonoda et al.

(10) Patent No.: US 9,389,067 B2
(45) Date of Patent: Jul. 12, 2016

(54) THREE-DIMENSIONAL SHAPE MEASURING APPARATUS, THREE-DIMENSIONAL SHAPE MEASURING METHOD, PROGRAM, AND STORAGE MEDIUM

(71) Applicant: CANON KABUSHIKI KAISHA, Tokyo (JP)

(72) Inventors: Tetsuri Sonoda, Yokohama (JP); Kenji Saitoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 291 days.

(21) Appl. No.: 14/017,075

(22) Filed: Sep. 3, 2013

(65) Prior Publication Data

US 2014/0063192 A1    Mar. 6, 2014

(30) Foreign Application Priority Data

Sep. 5, 2012 (JP) ................................. 2012-195085
Sep. 5, 2012 (JP) ................................. 2012-195086

(51) Int. Cl.
*G01B 11/22* (2006.01)
*G01B 11/25* (2006.01)

(52) U.S. Cl.
CPC ............ *G01B 11/22* (2013.01); *G01B 11/2513* (2013.01)

(58) Field of Classification Search
USPC ...................................................... 348/42–60
See application file for complete search history.

(56) References Cited

U.S. PATENT DOCUMENTS

| | | | | |
|---|---|---|---|---|
| 2003/0016218 A1* | 1/2003 | Zwicker | .................. | G06T 15/04 345/424 |
| 2006/0291567 A1* | 12/2006 | Filippini | ................ | H04N 19/61 375/240.24 |
| 2008/0031513 A1* | 2/2008 | Hart | .................... | G01B 11/2545 382/154 |
| 2008/0195336 A1* | 8/2008 | Badju | .................. | A61B 5/0066 702/75 |
| 2012/0081360 A1* | 4/2012 | Uehira | ............... | G01B 11/2545 345/419 |
| 2014/0307261 A1* | 10/2014 | Popescu | ................. | G01N 21/45 356/450 |
| 2015/0176983 A1* | 6/2015 | Schick | ................. | G01B 11/005 356/602 |

OTHER PUBLICATIONS

Ryusuke Sagawa et al., "Dense One-shot 3D Reconstruction by Detecting Continuous Regions with Parallel Line Projection", Collected Papers of Meeting on Image Recognition and Understanding (MIRU2011), 2011, pp. 416-423.*

* cited by examiner

*Primary Examiner* — Dave Czekaj
*Assistant Examiner* — Shanika Brumfield
(74) *Attorney, Agent, or Firm* — Canon USA Inc. IP Division

(57) ABSTRACT

An information processing apparatus includes a projection unit configured to project a projection pattern onto an object, an imaging unit configured to capture an image of the object on which the projection pattern is projected, and a derivation unit configured to derive a three-dimensional shape of the object based on the image captured by the imaging unit. The projection pattern projected on the object by the projection unit includes a first pattern including a continuous luminance variation repetitively arranged at certain distances in a predetermined direction, and a second pattern having information for identifying the position of the measurement pattern in the captured image in an area between peaks in the measurement pattern.

13 Claims, 35 Drawing Sheets

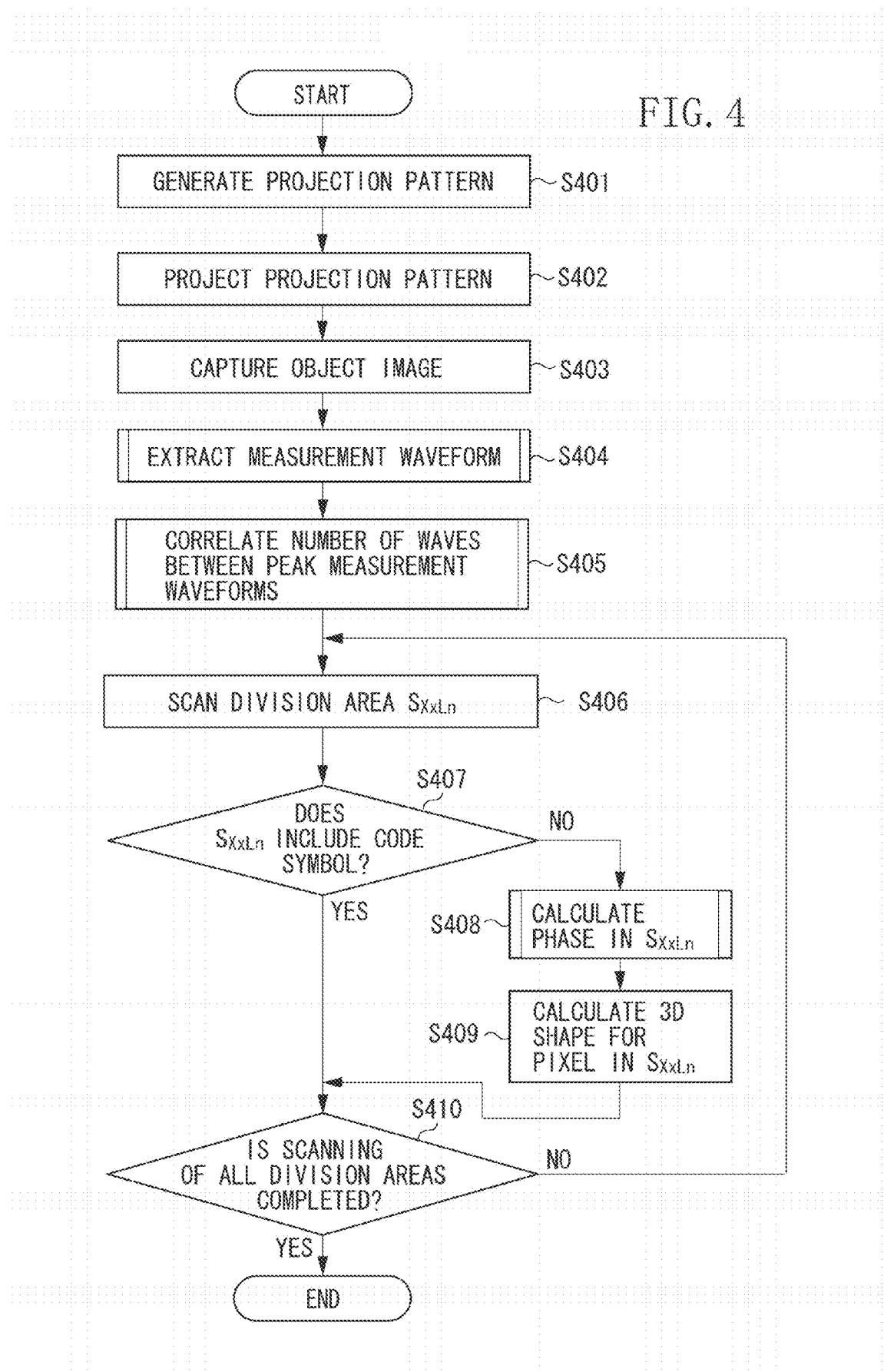

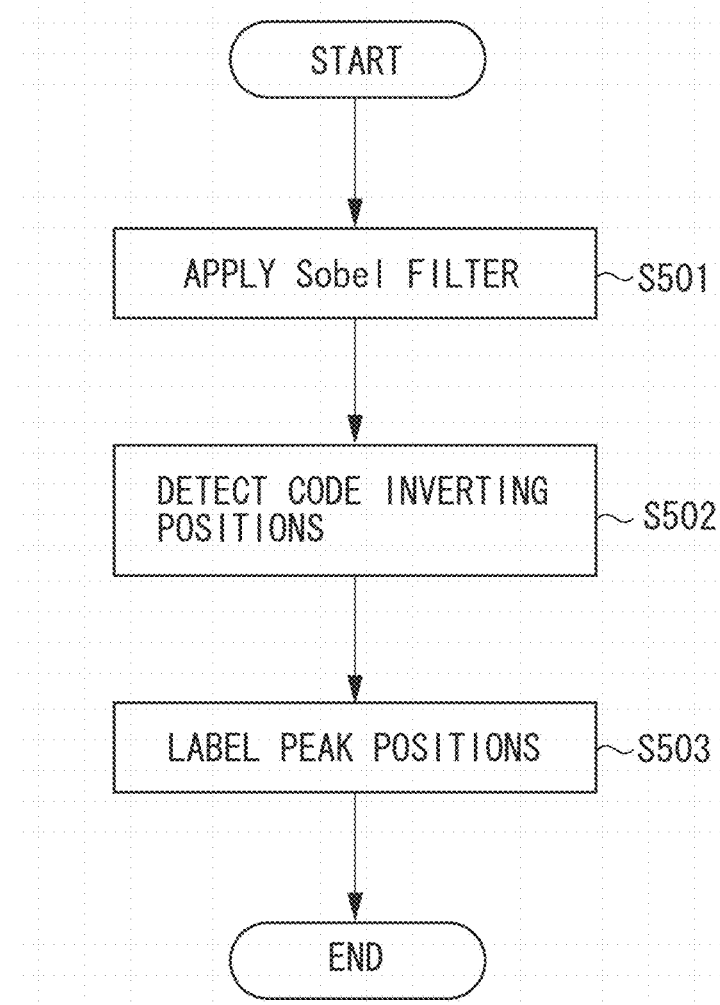

FIG. 6

| 1 | 2 | 1 |
|---|---|---|
| 0 | 0 | 0 |
| −1 | −2 | −1 |

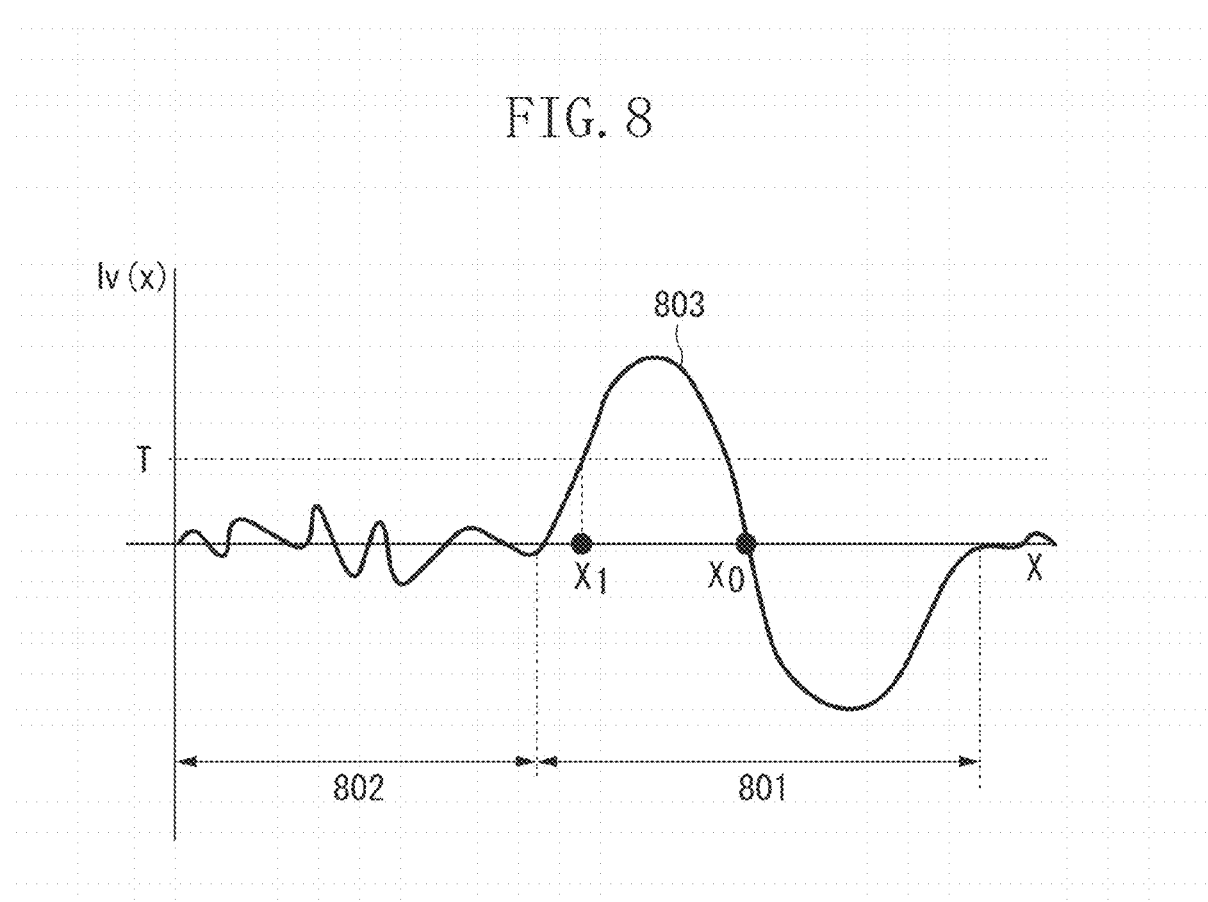

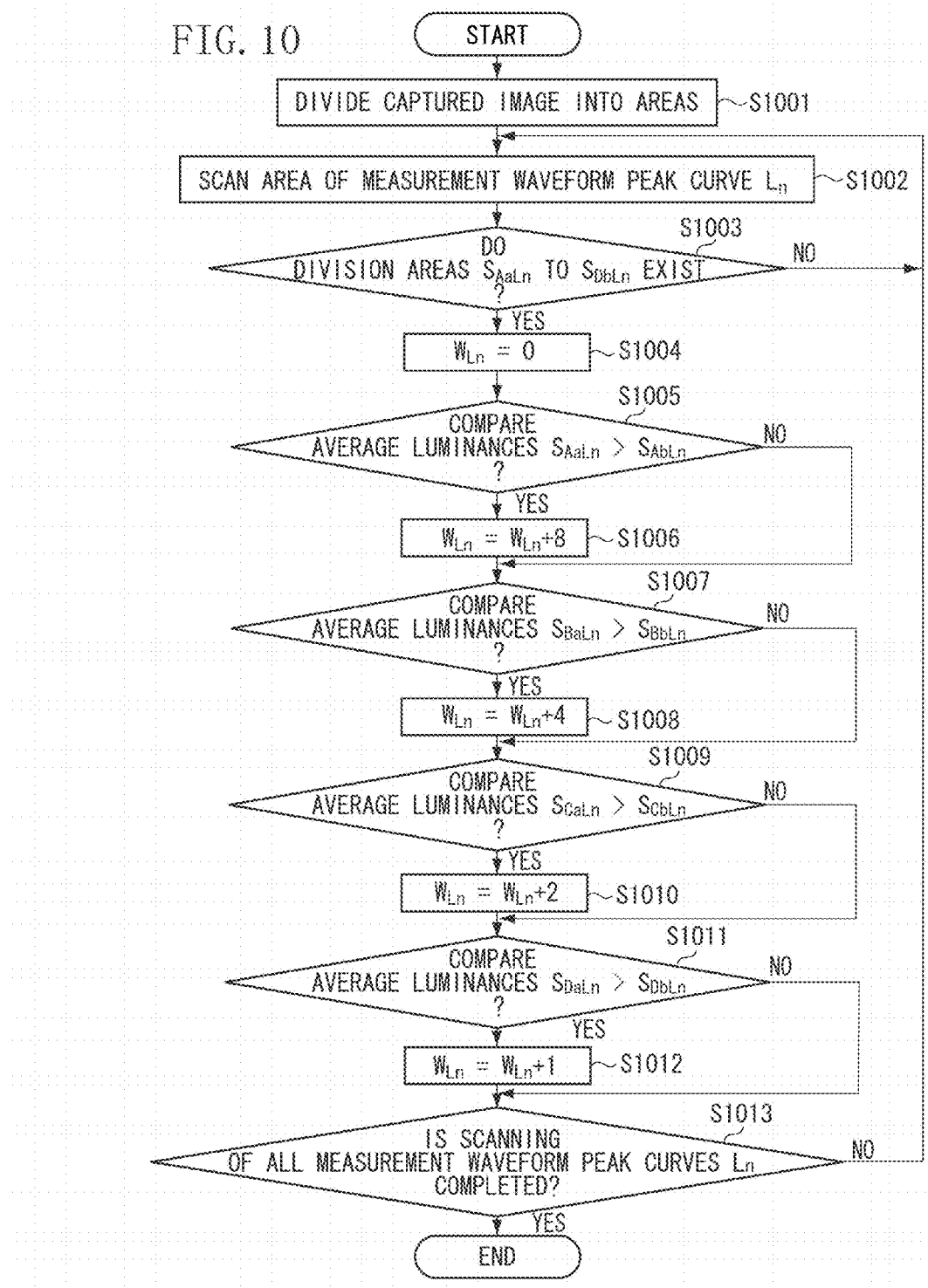

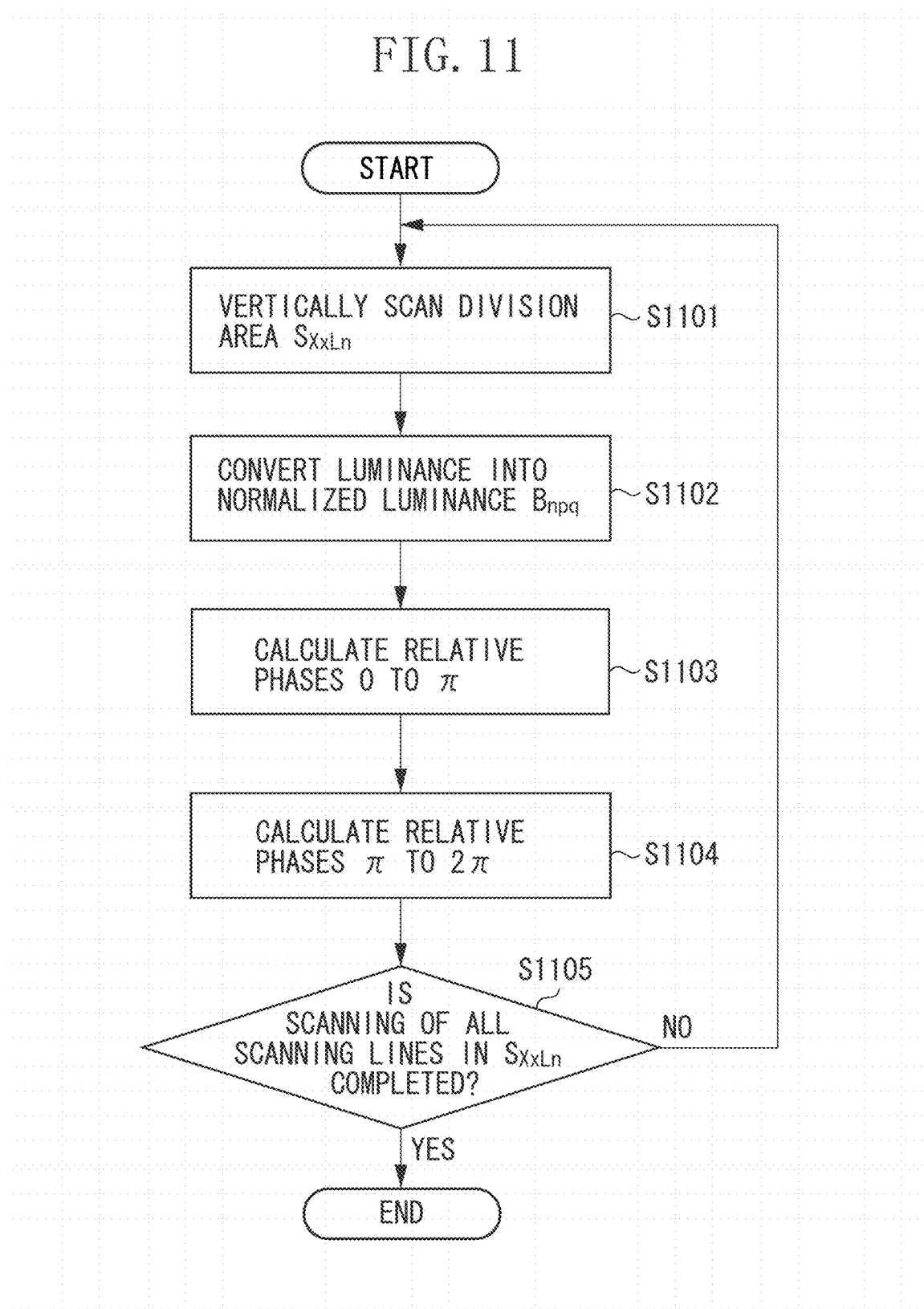

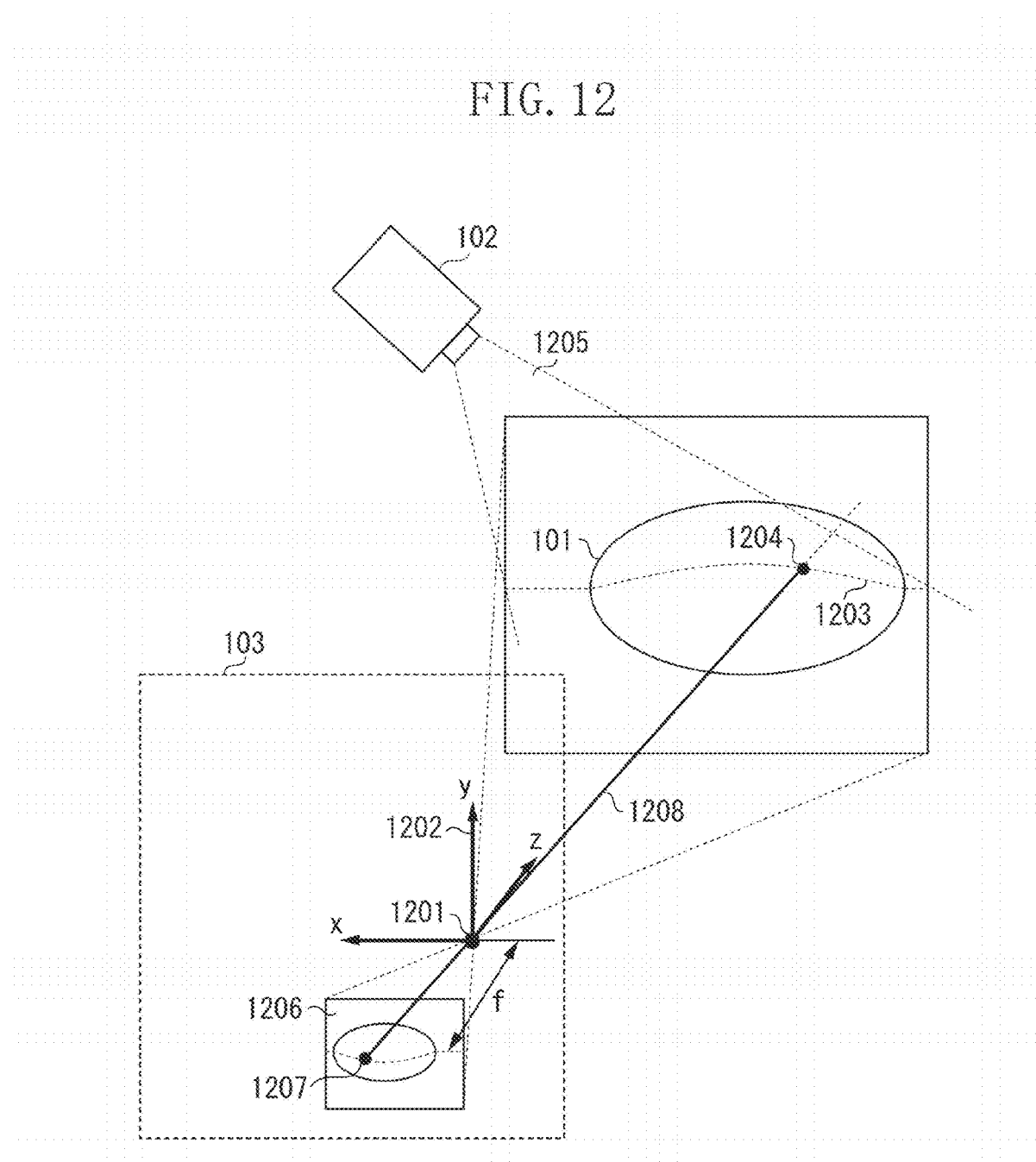

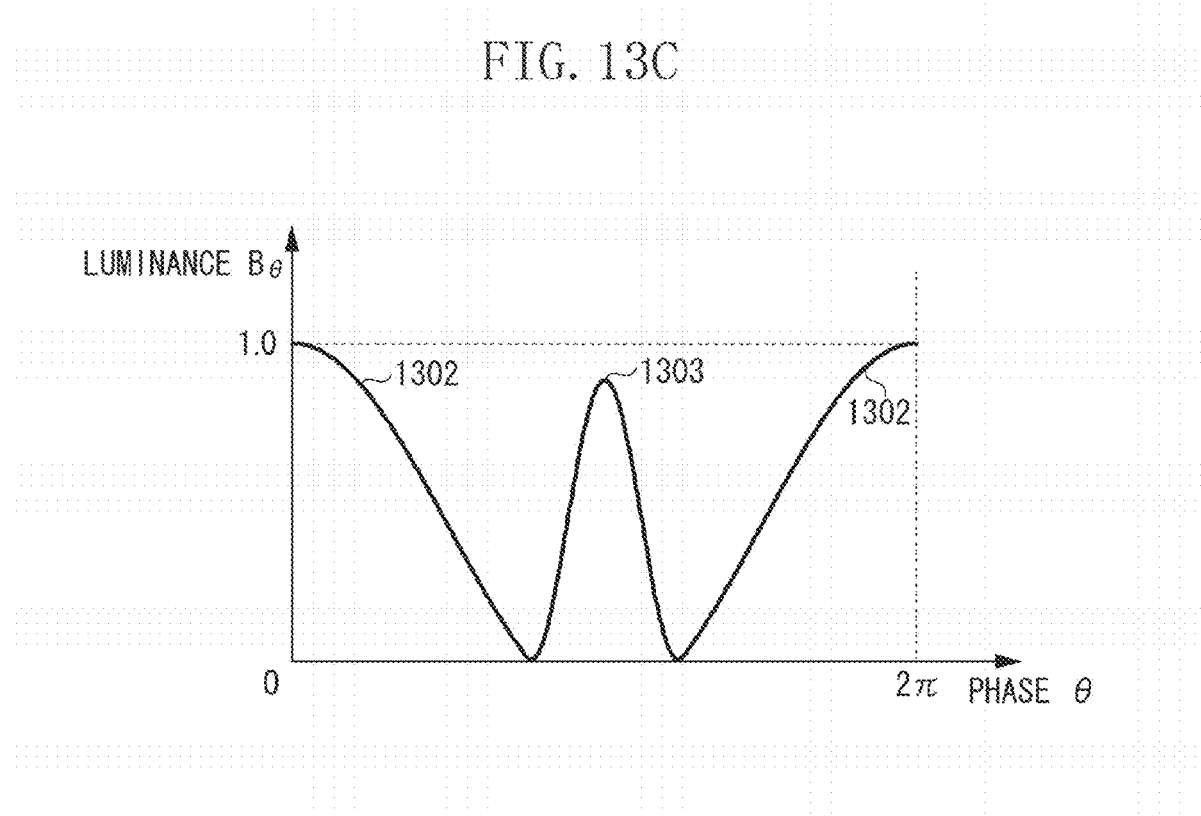

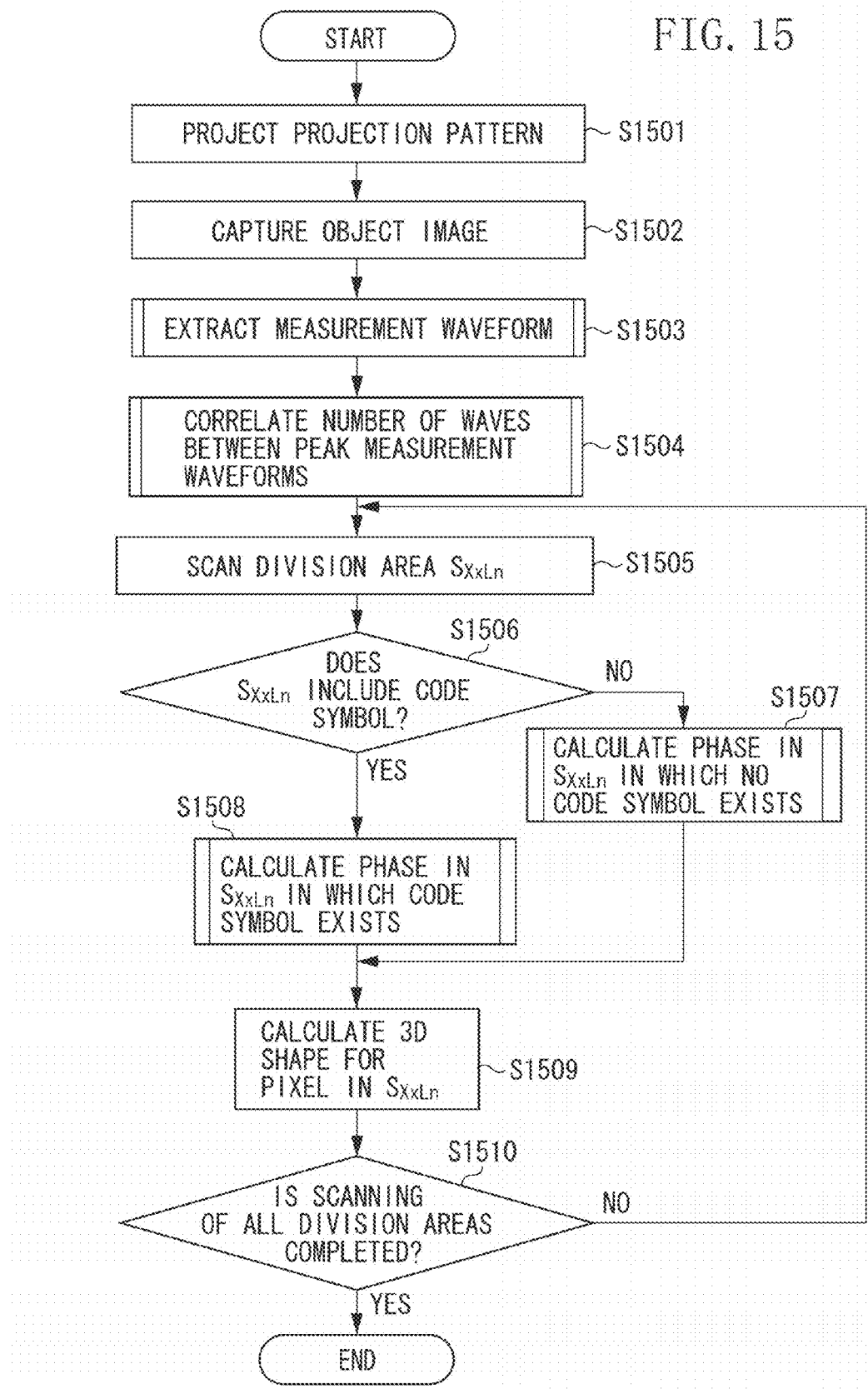

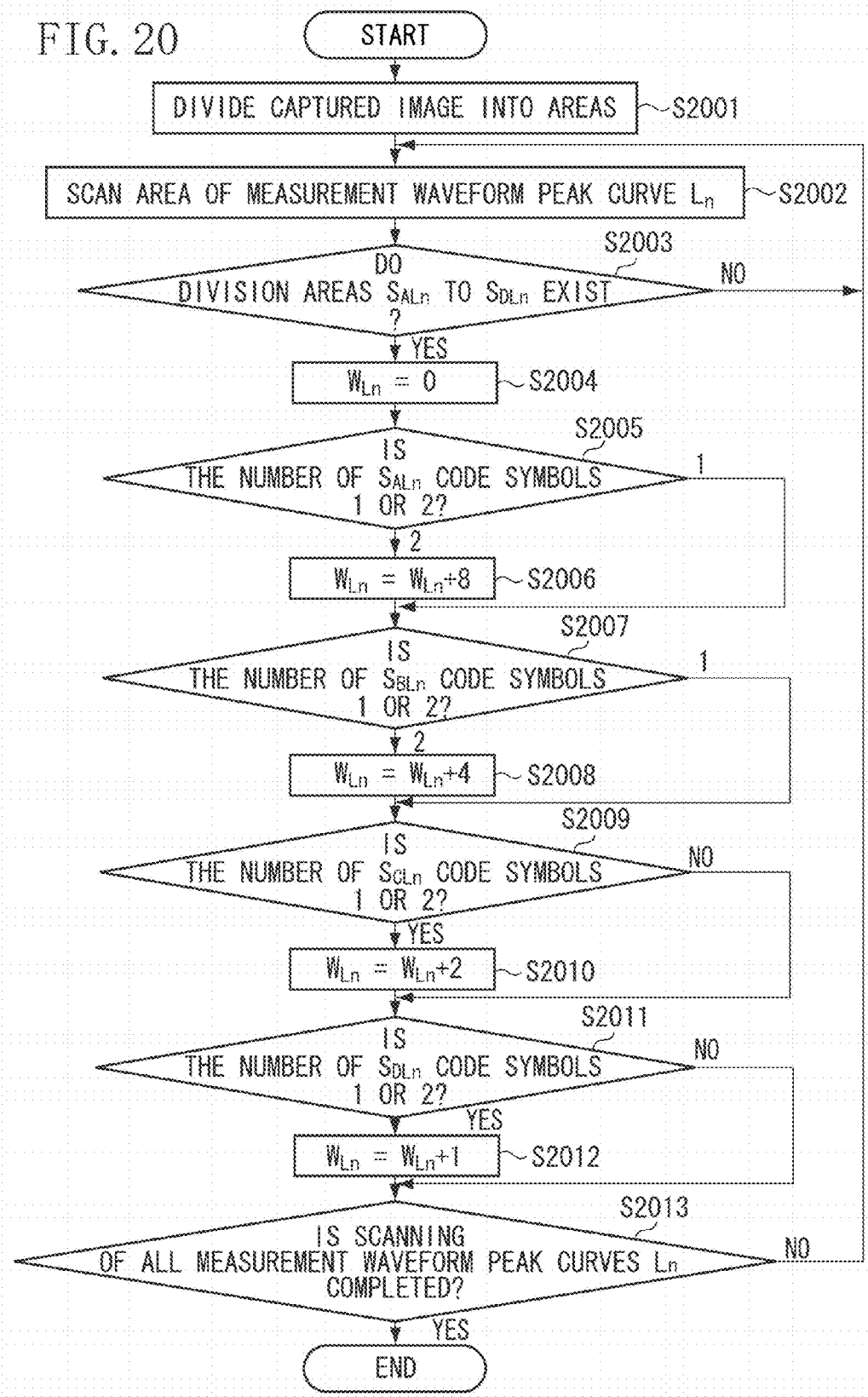

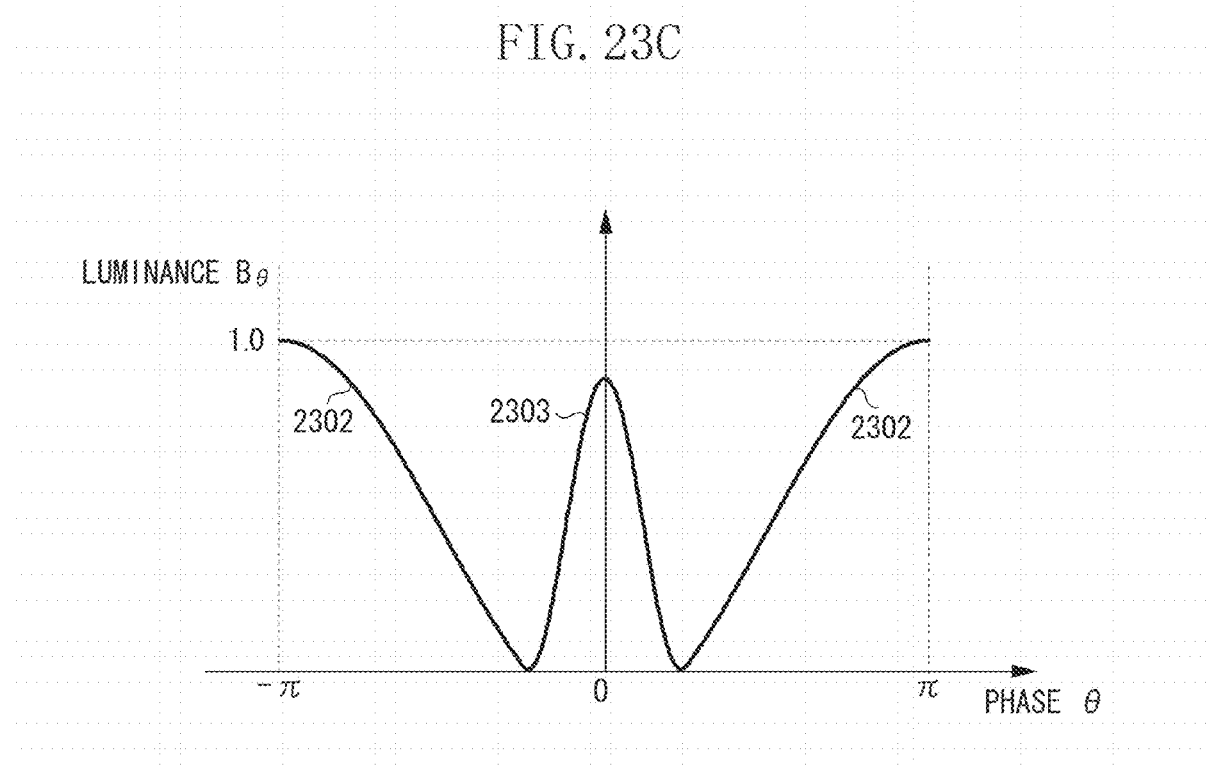

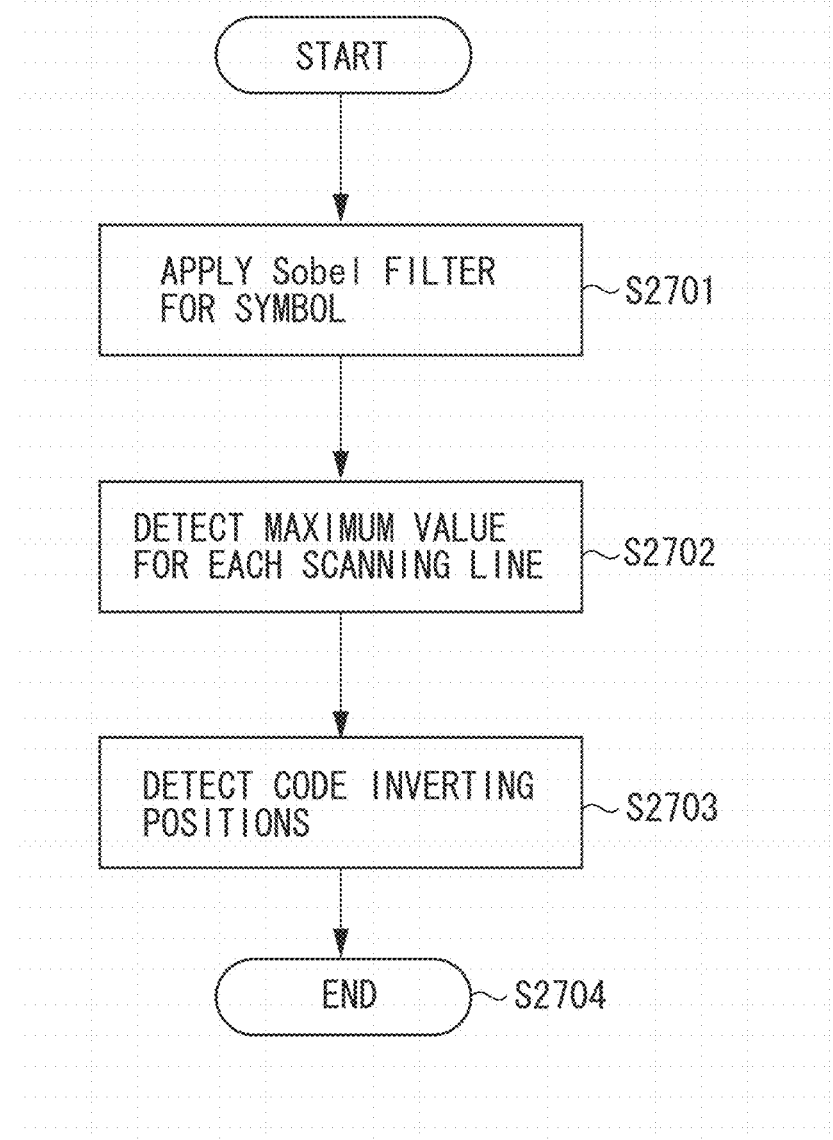

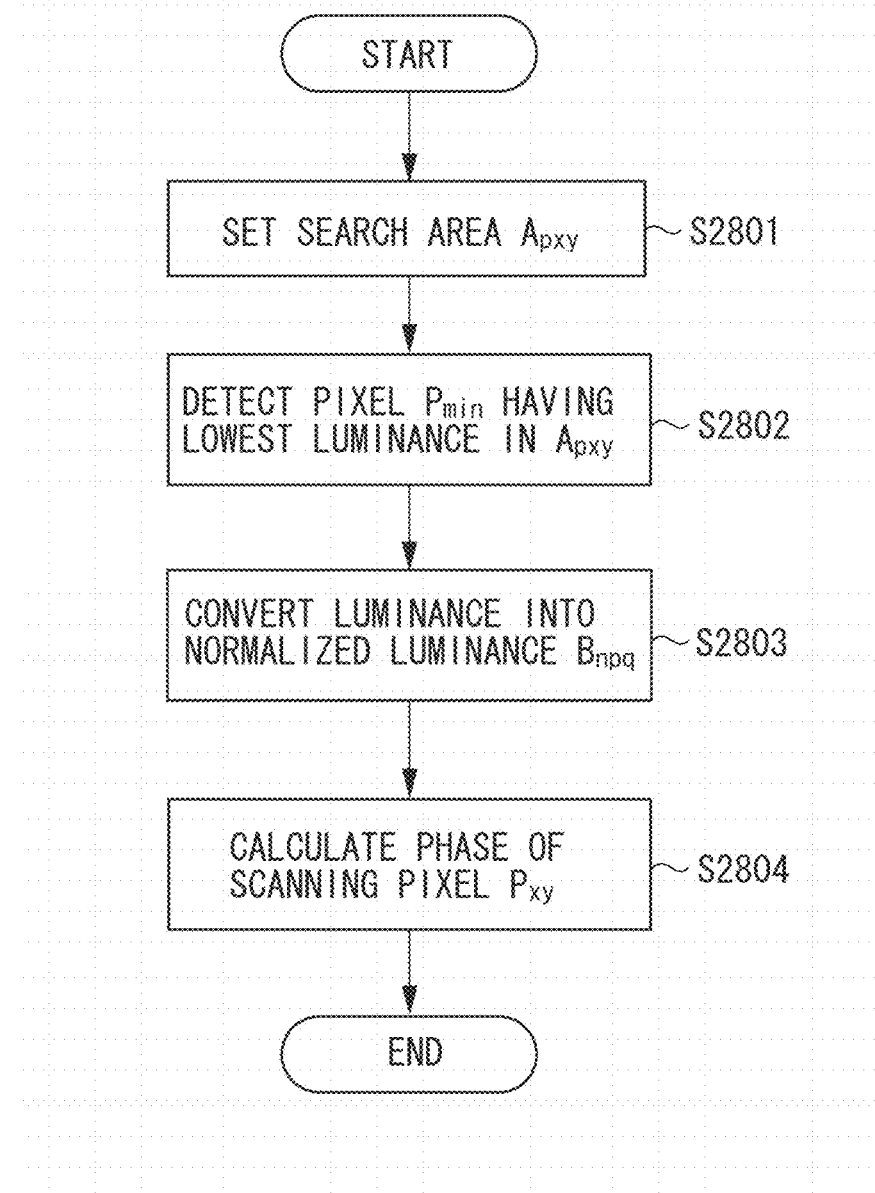

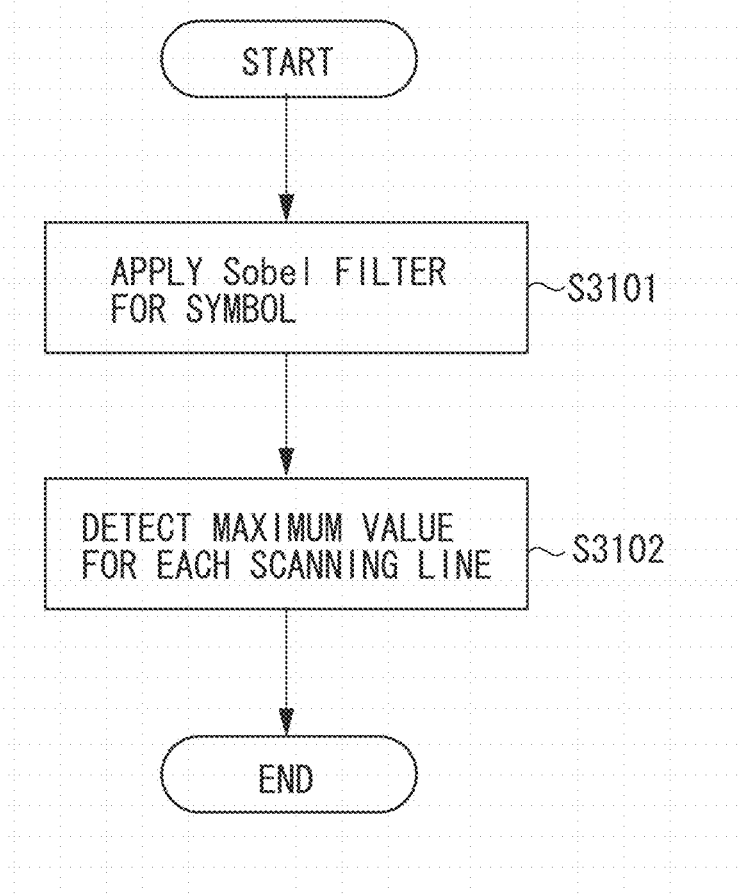

THREE-DIMENSIONAL SHAPE MEASURING APPARATUS, THREE-DIMENSIONAL SHAPE MEASURING METHOD, PROGRAM, AND STORAGE MEDIUM

BACKGROUND OF THE INVENTION

1. Field of the Invention

The present invention relates to a technique for measuring a three-dimensional shape of the surface of an object by projecting a projection pattern onto an object and capturing an image of the projected projection pattern.

2. Description of the Related Art

The conventional active three-dimensional shape measurement projects a fringe pattern onto an object, captures an image of the projected fringe pattern, and calculates distortions of the fringe pattern based on the captured image, thus measuring a three-dimensional shape and surface distortion conditions of the object. In particular, the phase shift method has been widely applied. This method projects a fringe pattern having a sinusoidal-wave-shaped luminance variation onto an object, and captures a plurality of images while shifting the phase of the fringe pattern, thus measuring a three-dimensional shape and surface distortion conditions of the object with high density and high accuracy.

However, the phase shift method premises that a plurality of images is captured in a state where the shape of the object remains unchanged, and phase calculation is performed. Therefore, the phase shift method has a problem that measurement cannot be accurately performed if the object moves or transforms during image capturing.

To solve this problem, there has been employed a technique for performing phase calculation by capturing only one image, instead of a plurality of images. A method discussed in Ryusuke Sagawa, Hiroshi Kawasaki, Ryo Furukawa, Shota Kiyota, "Dense One-shot 3D Reconstruction by Detecting Continuous Regions with Parallel Line Projection", Collected Papers of Meeting on Image Recognition and Understanding (MIRU2011), pp. 416-423 (2011) projects one piece of vertical and horizontal line patterns uniformly colored in green and blue in a specific order onto an object, and captures only one image of the projected line patterns. More specifically, the method corresponds the order of the projected line patterns with the order of the captured line patterns, applies a Gabor filter to the captured line patterns as a fringe pattern having a luminance variation, and performs phase calculation based on the one captured image, thus measuring a three-dimensional shape with high density.

However, in the method discussed in the above-described nonpatent document, since two different colors are used for the line patterns in the projection pattern, the waveforms of the line patterns of respective colors are largely affected by the surface color of the object, resulting in failed correspondence between the order of the projected line patterns and the order of the captured line patterns. Further, the measurement accuracy is remarkably degraded because phase calculation cannot be accurately performed.

SUMMARY OF THE INVENTION

According to an aspect of the present invention, an information processing apparatus includes a projection unit configured to project a projection pattern onto an object, an imaging unit configured to capture an image of the object on which the projection pattern is projected, and a derivation unit configured to derive a three-dimensional shape of the object based on the image captured by the imaging unit. The projection pattern projected on the object by the projection unit includes a first pattern including a continuous luminance variation repetitively arranged at certain distances in a predetermined direction, and a second pattern having information for identifying the position of the measurement pattern in the captured image in an area between peaks in the measurement pattern.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart illustrating processing according to the first exemplary embodiment.

FIG. 5 is a flowchart illustrating detailed processing in step S404 according to the first exemplary embodiment.

FIG. 6 illustrates a Sobel filter used in the exemplary embodiments of the present invention.

FIG. 8 illustrates an exemplary variation in value of a vertical Sobel filter image in the scanning direction.

FIG. 10 is a flowchart illustrating detailed processing in step S405 according to the first exemplary embodiment.

FIG. 11 is a flowchart illustrating detailed processing in step S408 according to the first exemplary embodiment.

FIG. 12 is a schematic view illustrating a case for measuring the position of an arbitrary measuring point 1204 on a vertical position $Y_{Qpq}$ of the projection pattern.

FIGS. 13A to 13C illustrate a projection pattern according to a second exemplary embodiment.

FIG. 15 is a flowchart illustrating processing according to the second exemplary embodiment.

FIG. 20 is a flowchart illustrating detailed processing in step S1905 according to the third exemplary embodiment.

FIGS. 23A to 23C illustrate a projection pattern according to the fourth exemplary embodiment.

FIG. 27 is a flowchart illustrating processing in step S2405 according to the fourth exemplary embodiment.

FIG. 28 is a flowchart illustrating processing in step S2408 according to the fourth exemplary embodiment.

FIG. 31 is a flowchart illustrating processing in step S2405 according to the fifth exemplary embodiment.

DESCRIPTION OF THE EMBODIMENTS

Various exemplary embodiments, features, and aspects of the invention will be described in detail below with reference to the drawings.

Desirable exemplary embodiments of the present invention will be described below with reference to the accompanying drawings.

Figure 1:
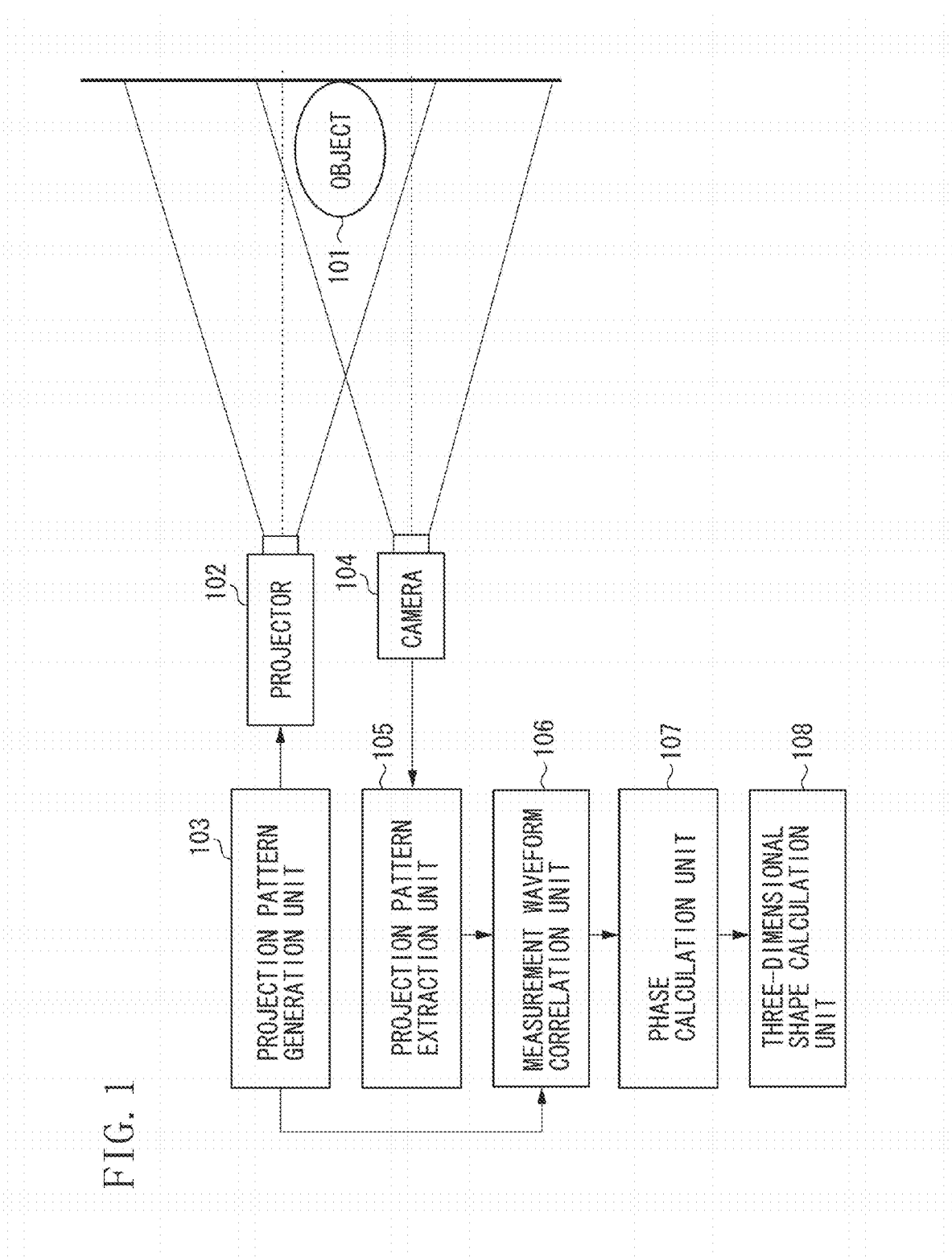
FIG. 1 illustrates an overall configuration of an apparatus according to exemplary embodiments of the present invention.

A three-dimensional shape measuring apparatus according to a first exemplary embodiment is directed to measuring the surface shape of an object, and has a configuration illustrated in FIG. 1. However, the configuration illustrated in FIG. 1 is to be considered as an example, and various modifications are possible. For example, some constituent elements may be integrated into one constituent element, or one constituent element may be divided into a plurality of constituent elements.

A projector 102 functions as a projection unit for projecting a projection pattern on an object 101 to be measured. This projection pattern may be prestored in a memory in the projector 102, or generated and supplied by a projection pattern generation unit (described below), or supplied from an external device (not illustrated) to the projector 102.

Figure 2A:
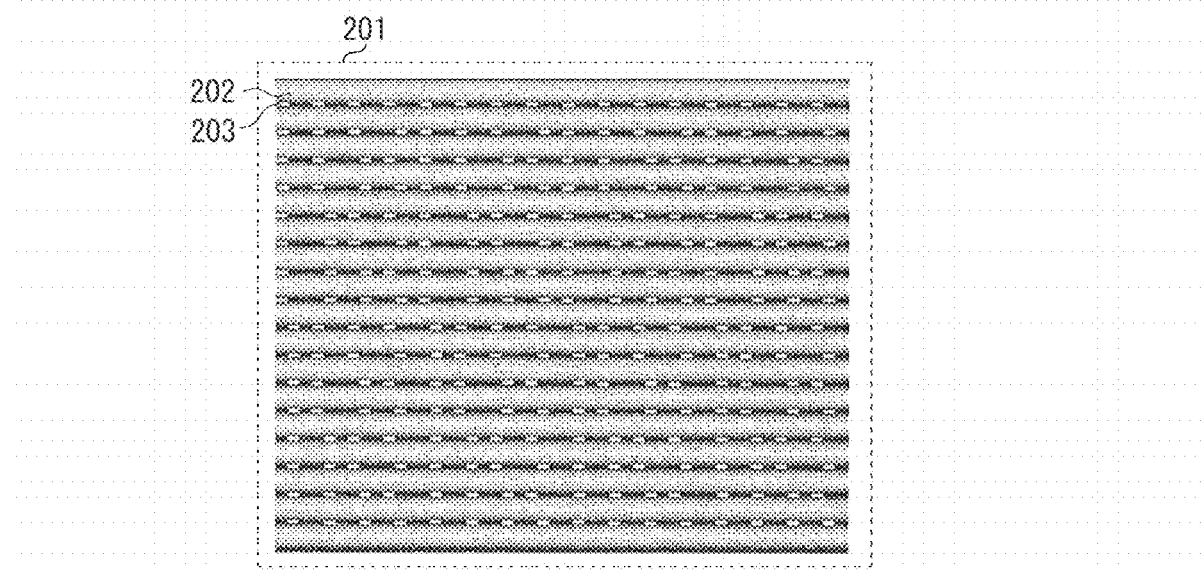
FIGS. 2A to 2C illustrate a projection pattern according to a first exemplary embodiment.

FIG. 2A illustrates a configuration of a projection pattern 201 to be used for the present exemplary embodiment. The projection pattern 201 to be used for the present exemplary embodiment is a monochromatic pattern including a measurement-waveform (first pattern) 202 having a continuous sinusoidal-wave-shaped luminance variation repetitively arranged in the vertical direction (first direction), and a plurality of code symbols 203 (second pattern) superimposed between the waves of the measurement-waveform 202. This means that the measurement-waveform 202 and the code symbols 203 have the same color. Each code symbol 203 is a waveform in which information used for measurement-waveform correspondence (described below) is coded. In the present exemplary embodiment and subsequent exemplary embodiments, the word "monochrome" includes monochromatic gradation.

The three-dimensional shape measuring apparatus includes a projection pattern generation units 103, a projection pattern control unit 109 (not illustrated), a projection pattern extraction unit 105, a measurement-waveform corresponding unit 106, a phase calculation unit 107, and a three-dimensional shape calculation unit 108. These units are constituted by a general-purpose computer (hardware) including a central processing unit (CPU), a memory, a storage device, such as a hard disk, and various input/output interfaces. Each of the projection pattern generation unit 103, the projection pattern control unit 109, the projection pattern extraction unit 105, the measurement-waveform corresponding unit 106, the phase calculation unit 107, and the three-dimensional shape calculation unit 108 is realized when the CPU executes a relevant program.

The projection pattern generation unit 103 functions to generate data of a projection pattern to be projected by the projector 102 according to certain rules (described below).

The projection pattern control unit 109 (not illustrated) transmits the projection pattern generated by the projection pattern generation unit 103 to the projector 102. The data is prestored in the storage device.

The camera 104 functions as an imaging unit for capturing an image of the object 101, on which the projection pattern is projected, to generate a captured image 301, and transmitting the captured image 301 to the subsequent projection pattern extraction unit 105. The optical axis of the camera 104 and the optical axis of the projector 102 are arranged in parallel, and almost perpendicularly to the object 101.

Upon acquisition of the captured image 301 transmitted from the camera 104, the projection pattern extraction unit 105 selectively extracts a measurement-waveform peak curve on the captured image 301 equivalent to a mountain-shaped portion of the measurement-waveform 202 in the projection pattern 201 exiting in the acquired captured image 301.

The measurement-waveform corresponding unit 106 decodes the code symbols 203 from the captured image 301 to acquire code information to be used for measurement-waveform correspondence (described below). Based on this code information, the measurement-waveform corresponding unit 106 correlates the number of waves between a captured image waveform peak curve obtained by the projection pattern extraction unit 105 and each measurement-waveform peak curve in the captured image 301. The measurement-waveform corresponding unit 106 identifies the position of the measurement-waveform 202 on the captured image 301.

The phase calculation unit 107 calculates the phase of a sine wave for areas between measurement-waveform peak positions within the captured image 301. In an area where the code symbol 203 exists, a waveform different from the sine wave is produced and therefore the phase calculation unit 107 does not perform phase calculation.

The three-dimensional shape calculation unit 108 calculates the depth from the camera 104 to the object 101 within the captured image 301, i.e., a three-dimensional shape of the object 101. Specifically, the three-dimensional shape calculation unit 108 calculates a three-dimensional shape based on the result of measurement-waveform correlation obtained by the measurement-waveform corresponding unit 106, the phase calculated by the phase calculation unit 107, and a positional relation obtained in advance between the projector 102 and the camera 104.

FIG. 4 is a flowchart illustrating processing according to the present exemplary embodiment. Processing in each step of the flowchart will be described below.

In step S401, the projection pattern generation unit 103 (see FIG. 1) generates data of the projection pattern 201 (see FIG. 2A) according to the following rules.

Figure 2B:
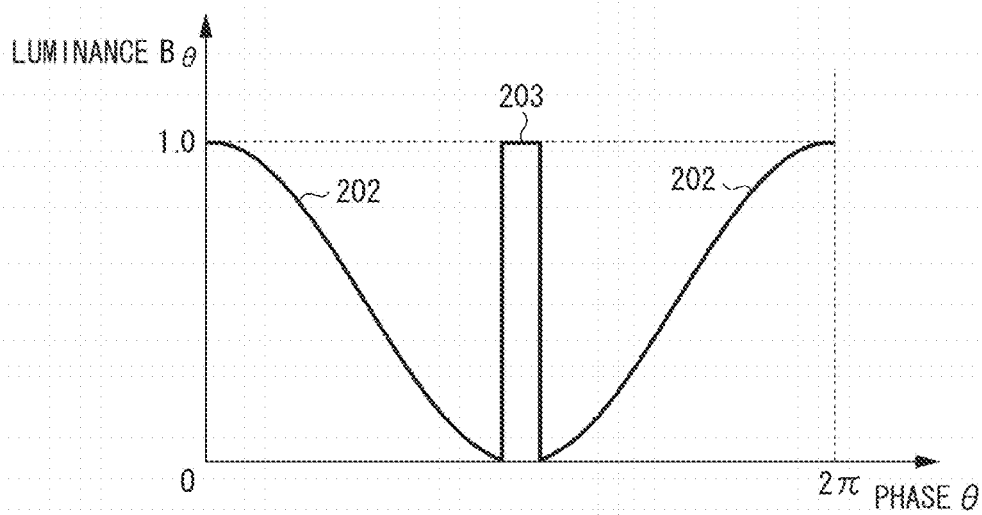

The projection pattern 201 is a monochromatic pattern including the measurement-waveform 202 having a continuous sinusoidal-wave-shaped luminance variation repetitively arranged in the vertical direction, and the plurality of code symbols 203 superimposed between the waves of the measurement-waveform 202. Information (described below) to be used for corresponding the number of waves in the measurement-waveform 202 is coded in the code symbols 203. FIG. 2B illustrates a variation in the luminance B of an area where the code symbol 203 exists, assuming that the peak position of the measurement-waveform 202 is a phase 0 on the horizontal axis, and the adjacent lower peak position of the measurement-waveform 202 is a phase $2\pi$ thereon.

Figure 2C:
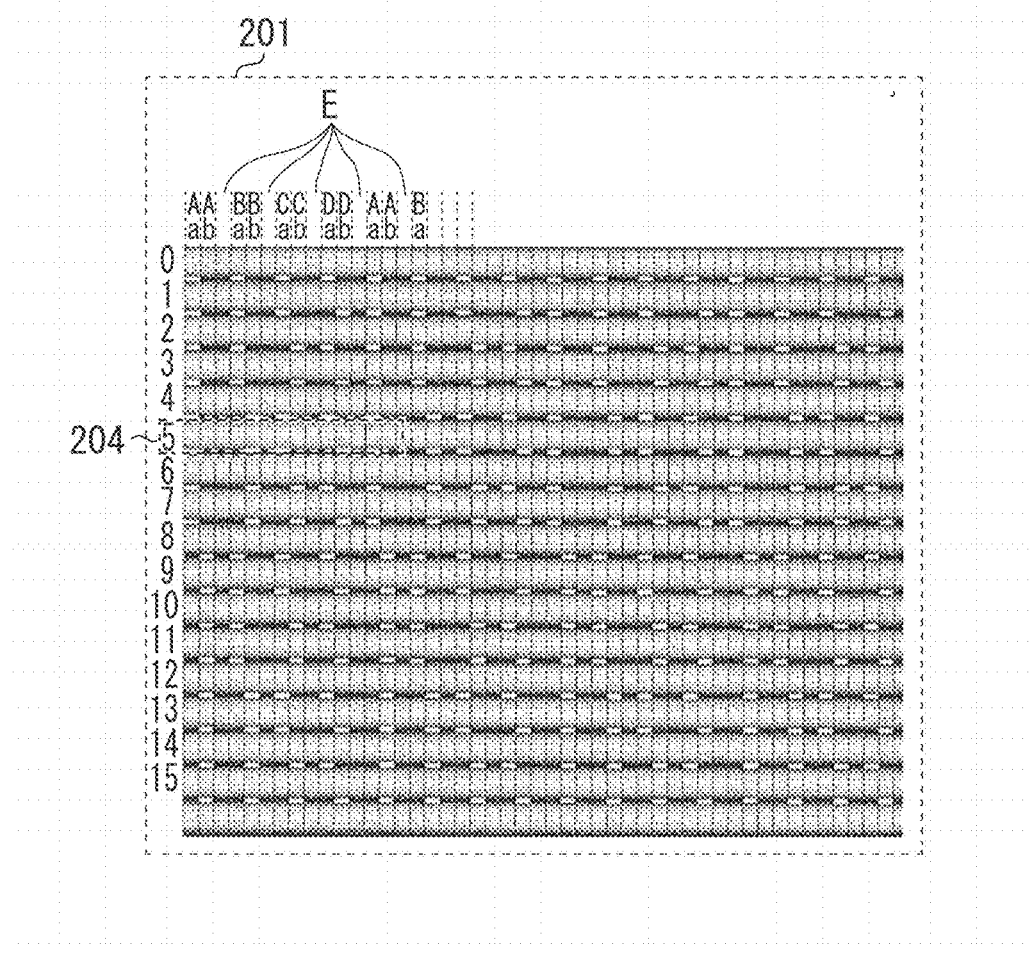
Figure 3A:
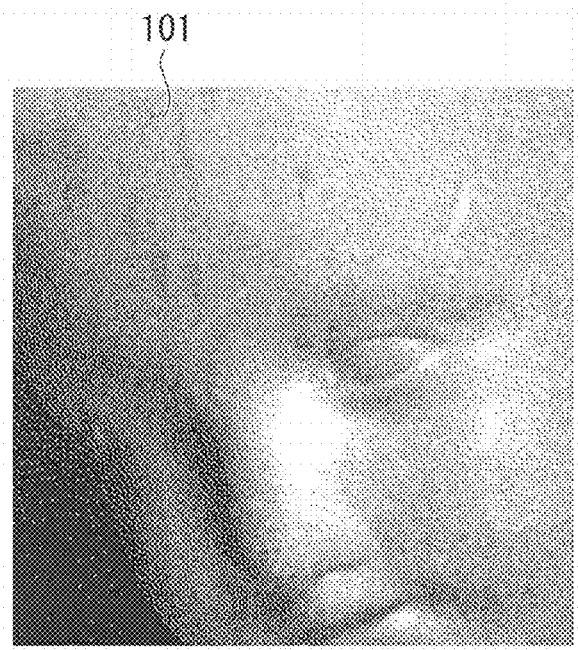
FIGS. 3A and 3B illustrate an object on which the projection pattern according to the first exemplary embodiment is projected.
Figure 3B:
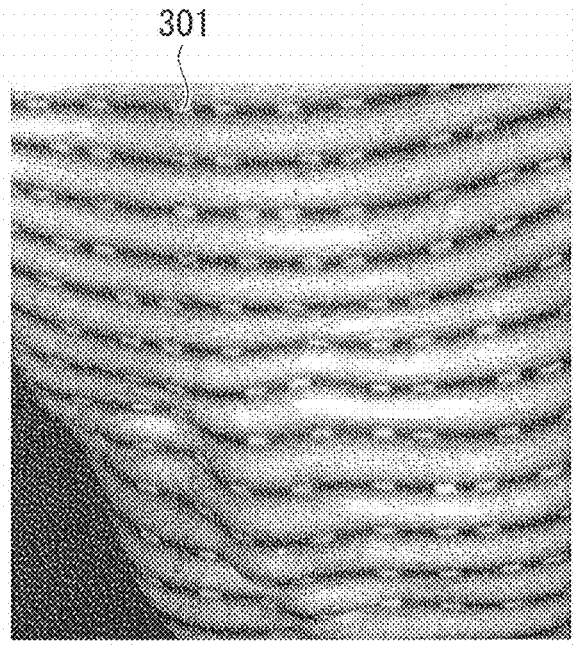

As illustrated in FIG. 2C, the projection pattern 201 includes areas Aa, Ab, Ba, Bb, Ca, Cb, Da, and Db repetitively arranged in this order in the horizontal direction, and a gap area E inserted between areas A, B, C, and D. Each of the areas A to D is divided in the vertical direction by the code symbols 203 which intermittently appear. Each code symbol 203 is arranged in the middle between measurement-waveform peak positions, in units of the areas Aa to Db, and includes as code information the number of waves W (0 to 15) of the measurement-waveform peak right above the code symbol 203 on the measurement-waveform 202.

Specifically, each of areas Ax, Bx, Cx, and Dx (x=a, b) represents a binary digit (0 or 1), and the areas Ax, Bx, Cx, and Dx collectively represent a 4-digit binary number. When the code symbol 203 exists in each of areas Xa (X=A, B, C, D), the relevant binary digit represents 0. When the code symbol 203 exists in each of areas Xb (X=A, B, C, D), the relevant binary digit represents 1. For example, referring to an area 204 illustrated in FIG. 2C, since the code symbol 203 exists in the areas Aa, Bb, Ca, and Db, the 4-digit binary number is 0101. The binary number 0101 is converted into a decimal number W of 5.

A gap area E is arranged between the areas Ax, Bx, Cx, and Dx (x=a, b) to prevent mis-detection due to noise. The code symbol 203 does not exist in the gap area E.

In step S402, the projector 102 projects onto the object 101 the projection pattern 201 (see FIG. 2A) generated in step S401.

In step S403, the camera 104 captures an image of the object 101, on which the projection pattern 201 is projected by the projector 102, to generate a captured image 301, and transmits the generated captured image 301 to the subsequent projection pattern extraction unit 105.

In step S404, the projection pattern extraction unit 105 selectively extracts the measurement-waveform 202 in the projection pattern 201 existing in the captured image 301 transmitted from the camera 104. Processing in step S304 will be described in detail below with reference to the flowchart illustrated in FIG. 5.

Figure 6:
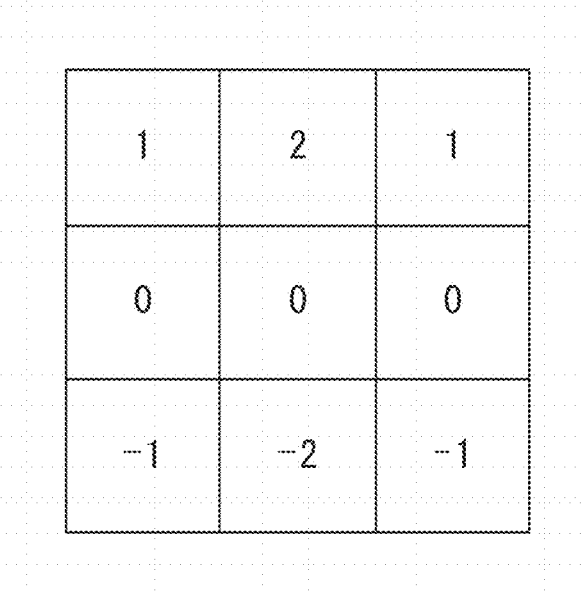

In step S501, the projection pattern extraction unit 105 applies Sobel filtering performing a differential action in the vertical direction on the captured image 301 (acquired in step S403) to generate a vertical Sobel filter image. The Sobel filter is a kind of convolution filter. The present exemplary embodiment employs a Sobel filter having a 3×3 matrix size, as illustrated in FIG. 6.

In step S502, the projection pattern extraction unit 105 scans the vertical Sobel filter image (acquired in step S501) to detect positions where the sign of the value is inverted, as measurement-waveform peak positions. The following describes detailed procedures for obtaining a measurement-waveform peak position by using a vertical Sobel filter.

Figure 7:
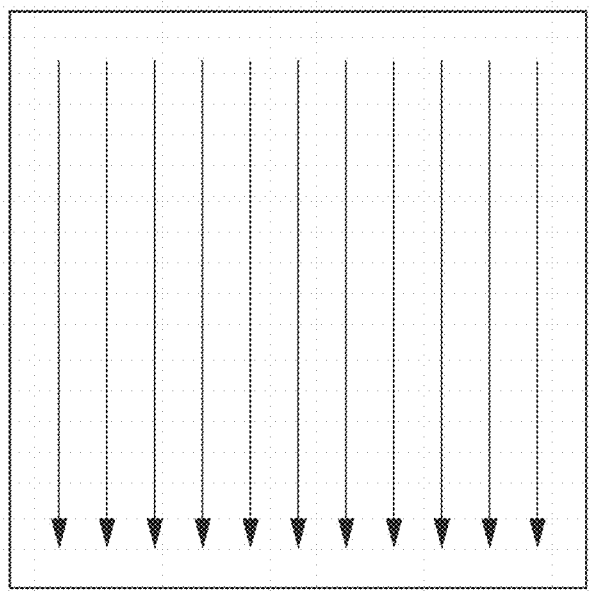
FIG. 7 illustrates the scanning direction of the Sobel filter.

First, assume that a vertical Sobel filter image $I_v$ gives a value $I_v(x)$ at a scanning position x. The scanning direction is set as the direction approximately perpendicular to the measurement-waveform 202, as illustrated in FIG. 7. The projection pattern extraction unit 105 scans the vertical Sobel filter image $I_v$ in this scanning direction to detect a position $x_t$ at which the value $I_v(x_t)$ exceeds a threshold value T, as represented by formula (1).

$$I_v(x_t) > T \qquad \text{formula (1)}$$

FIG. 8 illustrates an exemplary variation in value of the vertical Sobel filter image $I_v$ in the scanning direction. A portion indicated by a section 801 is equivalent to a position where a mountain-shaped portion of the measurement-waveform 202 exists. This threshold value processing eliminates noise and an effect of a minute value in a section 802 due to horizontal line pattern distortion by the object 101, enabling accurately detecting a rising portion 803 produced by the measurement-waveform 202 in the captured image 301.

Then, starting from the position $x_t$, the projection pattern extraction unit 105 scans a position $x_0$ where the following formula (2) is satisfied.

$$I_v(x_0) = 0 \qquad \text{formula (2)}$$

Figure 9A:
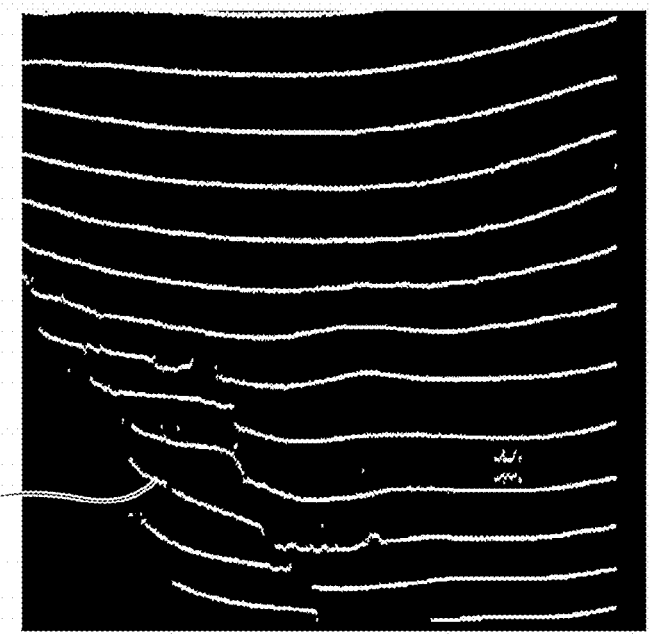
FIGS. 9A and 9B illustrate measurement-waveform point groups and measurement-waveform peak curves $L_n$.

The position $x_0$ satisfying the formula (2) indicates the position of the center of gravity where the luminance of the measurement-waveform 202 provides a local peak, as illustrated in FIG. 8. The projection pattern extraction unit 105 acquires the position $x_0$ as a measurement-waveform peak point $c_m$ (m=1, 2, 3, ..., $m_{max}$). The projection pattern extraction unit 105 repeats the above-described scanning for all of the positions x in the vertical Sobel filter image $I_v$ to acquire all of the measurement-waveform peak points $c_m$ in the vertical Sobel filter image $I_v$ as a measurement-waveform peak point group C. FIG. 9A illustrates a measurement-waveform point group C 901 at which the relevant positions in the captured image 103 are plotted.

In step S503, the projection pattern extraction unit 105 groups proximity points of the measurement-waveform peak point group C (acquired in step S403), and labels each group as a single area $L_n$ (n=1, 2, 3, ...). If the number of measurement-waveform peak points $c_m$ of a group is equal to or less than a threshold value $N_c$, the projection pattern extraction unit 105 recognizes the relevant group as noise, and hence does not label the group.

Figure 9B:
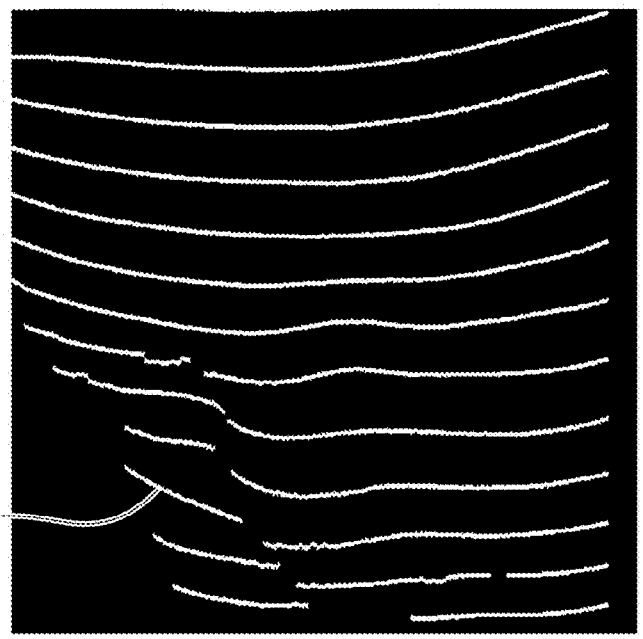

The above-described labeling can satisfactorily eliminate mis-detection due to noise and a luminance variation of the code symbol 203, and a measurement-waveform peak curve $L_n$ can be selectively extracted which is a curved area. FIG. 9B illustrates a measurement-waveform peak curve $L_n$ 902 extracted through labeling.

In step S405, the measurement-waveform corresponding unit 106 extracts code information from the captured image 301 (acquired in step S403) and the measurement-waveform 202 (extracted in step S404). Based on this code information, the measurement-waveform corresponding unit 106 correlates the number of waves between the measurement-waveform peak curve $L_n$ (extracted in step S404) and each measurement-waveform peak curve in the captured image 301.

FIG. 10 is a flowchart illustrating processing in step S405 for extracting code information, and correlating the number of waves for the measurement-waveform peak curve $L_n$. Processing in step S405 will be described below with reference to the step number of the flowchart in FIG. 10.

In step S1001, the measurement-waveform corresponding unit 106 divides the captured image 301 (acquired in step S403) in the vertical and horizontal directions into the following areas.

As first, the measurement-waveform corresponding unit 106 divides the captured image 301 in the vertical direction. As described above, the projection pattern 201 is divided into areas Aa, Ab, Ba, Bb, Ca, Cb, Da, and Db repetitively arranged in this order in the horizontal direction, and a gap area E inserted among areas Aa to Db. In the present exemplary embodiment, the optical axis of the camera 104 and the optical axis of the projector 102 are in parallel, and arranged almost perpendicularly to the object 101. This arrangement makes the division areas Aa to Db of the projection pattern 201 constant even in the captured image 301, regardless of the shape of the object 101. The division areas Aa to Db in the captured image 301 are prestored before measurement, and the captured image 301 is divided in the vertical direction.

Secondly, the measurement-waveform corresponding unit 106 divides the captured image 301 in the horizontal direction. Specifically, the measurement-waveform corresponding unit 106 divides an area enclosed by an arbitrary measurement-waveform peak curve $L_n$ (extracted in step S404) and the closest lower measurement-waveform peak curve $L_{n+1}$.

The measurement-waveform corresponding unit 106 acquires as a division area $S_{XxLn}$ (Xx=Aa, Ab, Db, E) the captured image 301 to which the above-described first and second divisions have been applied. The measurement-waveform corresponding unit 106 does not divide an area where either the measurement-waveform peak curve $L_n$ or $L_{n+1}$ is discontinuous in the middle of a division unit in the vertical direction, and excludes such an area from subsequent processing.

In step S1002, the measurement-waveform corresponding unit 106 scans all of the measurement-waveform peak curves $L_n$ (acquired in step S503) in the captured image 301.

In step S1003, the measurement-waveform corresponding unit 106 determines whether all of the division areas $S_{AaLn}$ to $S_{DbLn}$ exist in an area enclosed by the measurement-waveform peak curve $L_n$ to be scanned and the measurement-waveform peak curve $L_{n+1}$. As described above, the areas Aa to Db repetitively appear. Therefore, if these areas appear at least once, all of the division areas $S_{AaLn}$ to $S_{DbLn}$ are determined to exist. When all of the division areas $S_{AaLn}$ to $S_{DbLn}$ exist (YES in step S1003), the processing proceeds to step S1004. Otherwise, when not all of the division areas $S_{AaLn}$ to $S_{DbLn}$ exist (NO in step S1003), the processing returns to step S1002.

In step S1004, the measurement-waveform corresponding unit 106 initializes to 0 the number of waves $W_{Ln}$ on the measurement-waveform 202 of the measurement-waveform peak curve $L_n$ within a projected image 301. As described above, the number of waves $W_{Ln}$ is equivalent to the code information.

In step S1005, the measurement-waveform corresponding unit 106 compares the average luminance of the division area $S_{AaLn}$ with that of the division area $S_{AbLn}$ in the captured image 301. The measurement-waveform corresponding unit 106 determines that the code symbol 203 exists in an area having a higher average luminance. When the average luminance of the area $S_{AaLn}$ is higher than that of the area $S_{AbLn}$ (YES in step S1005), the processing proceeds to step S1006. Otherwise (NO in step S1005), the processing proceeds to step S1007.

In step S1006, the measurement-waveform corresponding unit 106 adds 8 (equivalent to a binary number 1000) to the number of waves $W_{Ln}$.

In step S1007, the measurement-waveform corresponding unit 106 compares the average luminance of the division area $S_{BaLn}$ with that of the division area $S_{BbLn}$ in the captured image 301. The measurement-waveform corresponding unit 106 determines that the code symbol 203 exists in an area having a higher average luminance. When the average luminance of the area $S_{BaLn}$ is higher than that of the area $S_{BbLn}$ (YES in step S1007), the processing proceeds to step S1008. Otherwise (NO in step S1007), the processing proceeds to step S1009.

In step S1008, the measurement-waveform corresponding unit 106 adds 4 (equivalent to a binary number 0100) to the number of waves $W_{Ln}$.

In step S1009, the measurement-waveform corresponding unit 106 compares the average luminance of the division area $S_{CaLn}$ with that of the division area $S_{CbLn}$ in the captured image 301. The measurement-waveform corresponding unit 106 determines that the code symbol 203 exists in an area having a higher average luminance. When the average luminance of the area $S_{CaLn}$ is higher than that of the area $S_{CbLn}$ (YES in step S1009), the processing proceeds to step S1010. Otherwise (NO in step S1009), the processing proceeds to step S1011.

In step S1010, the measurement-waveform corresponding unit 106 adds 2 (equivalent to a binary number 0010) to the number of waves $W_{Ln}$.

In step S1011, the measurement-waveform corresponding unit 106 compares the average luminance of the division area $S_{DaLn}$ with that of the division area $S_{DbLn}$ in the captured image 301. The measurement-waveform corresponding unit 106 determines that the code symbol 203 exists in an area having a higher average luminance. When the average luminance of the area $S_{DaLn}$ is higher than that of the area $S_{DbLn}$ (YES in step S1011), the processing proceeds to step S1012. Otherwise (NO in step S1011), the processing proceeds to step S1013.

In step S1012, the measurement-waveform corresponding unit 106 adds 1 (equivalent to a binary number 0001) to the number of waves $W_{Ln}$.

In step S1013, the measurement-waveform corresponding unit 106 determines whether scanning is completed for all of the measurement-waveform peak curves $L_n$ existing within the captured image 301. When scanning is completed (YES in step S1013), the processing in step S405 ends. Otherwise, when scanning is not completed (NO in step S1013), the processing returns to step S1002 to repeat scanning.

By performing the above procedures, for each measurement-waveform peak curve $L_n$, code information can be extracted from the code symbol 203 and the number of waves $W_{Ln}$ corresponding to measurement-waveform peaks in the projection pattern 201 can be acquired.

In step S406, the phase calculation unit 107 scans all of the division areas $S_{XxLn}$ (Xx=Aa, Ab, . . . , Db, E) (acquired in step S1001) in the captured image 301.

In step S407, the phase calculation unit 107 determines whether the code symbol 203 exists in the division area $S_{XxLn}$ (Xx=Aa, Ab, . . . , Db) to be scanned. To determine whether the code symbol 203 exists, the phase calculation unit 107 compares the average luminance of the division area $S_{XaLn}$ with that of the division area $S_{XbLn}$. When the average luminance of the division area $S_{XaLn}$ is higher than that of the division area $S_{XbLn}$, the phase calculation unit 107 determines that the code symbol 203 exists in the division area $S_{XaLn}$. Otherwise, when the average luminance of the division area $S_{XbLn}$ is higher than that of the division area $S_{XaLn}$, the phase calculation unit 107 determines that the code symbol 203 exists in the division area $S_{XbLn}$. As described above, the phase calculation unit 107 identifies the projecting positions of the code symbols 203 in units of division areas. When the code symbol 203 does not exist (NO in step S407), the processing proceeds to step S408. Otherwise, when the code symbol 203 exists (YES in step S407), the processing proceeds to step S409 without performing phase calculation. Specifically, in an area where the code symbol 203 exists, the phase calculation unit 107 does not perform phase calculation and therefore the phase value is indefinite. However, by interpolating phase values based on phases obtained in peripheral areas, a phase value can be obtained even for an area where the code symbol 203 exists.

In step S408, the phase calculation unit 107 performs phase calculation in the division area $S_{Xa}L_n$ to be scanned, to acquire the vertical position $Y_{Qpq}$ equivalent to the absolute phase in the projection pattern 201.

FIG. 11 is a flowchart illustrating procedures for performing phase calculation in the division area $S_{Xa}L_n$ in step S408. Processing in step S408 will be described below with reference to the step number of the flowchart.

In step S1101, the phase calculation unit 107 divides the division area $S_{Xa}L_n$ into pixel sequences in the vertical direction, and scans each pixel sequence as a scanning line $V_p$ ($p=1, 2, 3, \ldots, p_{max}$), where $p_{max}$ indicates the horizontal pixel width of the division area $S_{Xa}L_n$.

In step S1102, the phase calculation unit 107 sets a luminance $B_{upp}$ of an upper end pixel to $Q_{upp}$, sets a luminance $B_{downp}$ of a lower end pixel to $Q_{downp}$, and sets a luminance $B_{minp}$ of a minimum luminance pixel to $Q_{minp}$ in the scanning line $V_p$ to be scanned. The phase calculation unit 107 assigns these values to the following formulas (3) and (4) to convert a luminance $B_{pq}$ ($q=1, 2, 3, \ldots, q_{max}$) of the pixel $Q_{pq}$ constituting the scanning line $V_p$ into a normalized luminance $B_{npq}$, where $q_{max}$ indicates the number of pixels of the scanning line $V_p$.

When $Q_{upp} \leq Q_{pq} \leq Q_{minp}$ $$B_{npq} = \frac{B_{pq} - B_{minp}}{B_{upp} - B_{minp}} \quad \text{Formula (3)}$$

When $Q_{minp} < Q_{pq} \leq Q_{downp}$ $$B_{npq} = \frac{B_{pq} - B_{minp}}{B_{downp} - B_{minp}} \quad \text{Formula (4)}$$

In step S1103, the phase calculation unit 107 calculates relative phases of 0 to $\pi$ [rad] in the scanning line $V_p$ to be scanned, to acquire the vertical position $Y_{Qpq}$ equivalent to the absolute phase in the projection pattern 201. On the premise that the surface color of the object is constant within the range of the scanning line $V_p$, the normalized luminance $B_{npq}$ obtained in step S1102 directly indicates a relative phase based on the cosine value when the phase of the upper end scanning line $V_p$ is set to 0 within the phase range from 0 to $\pi$. Therefore, a relative phase value $\theta_{Qpq}$ [rad] on an arbitrary pixel $Q_{pq}$ in the scanning line $V_p$ is represented by the following formula (5).

$$\theta_{Qpq} = \cos^{-1} Q_{pq} \quad \text{Formula (5)}$$

When $0 \leq \theta_{Qpq} \leq \pi$, based on the above-described relative phase value $\theta_{Qpq}$ and the number of waves $W_{Ln}$ in the measurement-waveform peak area right above the division area $S_{Xa}L_n$ including the scanning line $V_p$, the vertical position $Y_{Qpq}$ of an arbitrary pixel $Q_{pq}$ on the projection pattern 201 is represented by the following formula (6).

$$Y_{Qpq} = Y_0 + Y_{phase}\left(W_{Ln} + \frac{\theta_{Qpq}}{2\pi}\right) \quad \text{Formula (6)}$$

Y0 indicates the vertical position of the measurement-waveform peak arranged at the top of the projection pattern 201, $Y_{phase}$ indicates the unit width between measurement-waveform peaks on the projection pattern 201, and $\pi$ indicates the circular constant. By performing the above-described calculation, the vertical position of an arbitrary pixel $Q_{pq}$ can be obtained within the relative phase range from 0 to $\pi$ on the scanning line $V_p$.

In step S1104, the phase calculation unit 107 calculates relative phases of $\pi$ to $2\pi$ [rad] within the scanning line $V_p$ to be scanned, to acquire the vertical position $Y_{Qpq}$ which is equivalent to the absolute phase in the projection pattern 201. When the reflection factor on the surface of the object in the projection pattern 201 is constant within the range of the scanning line $V_p$, and the phase of the lower end scanning line $V_p$ is $2\pi$, the relative phase value $\theta_{Qpq}$ [rad] on an arbitrary pixel $Q_{pq}$ in the scanning line $V_p$ is represented by the following formula (7).

$$\theta_{Qpq} = 2\pi - \cos^{-1} Q_{pq} \quad \text{Formula (7)}$$

When $\pi < \theta_{Qpq} \leq 2\pi$, based on the above-described relative phase value $\theta_{Qpq}$ and the number of waves $W_{Ln}$ for the measurement-waveform peak area right above the division area $S_{Xa}L_n$ including the scanning line $V_p$, the vertical position $Y_{Qpq}$ of an arbitrary pixel $Q_{pq}$ on the projection pattern 201 is represented by the formula (6), similar to step S1103. By performing the above-described calculation, the vertical position of an arbitrary pixel $Q_{pq}$ can be obtained within the relative phase range from $\pi$ to $2\pi$ on the scanning line $V_p$.

In step S1105, the phase calculation unit 107 determines whether scanning is completed for all of the scanning lines $V_p$ existing in the division area $S_{Xa}L_n$. When scanning is completed (YES in step S1105), the processing in step S408 ends. Otherwise, when scanning is not completed (NO in step S1105), the processing returns to step S1101 to repeat scanning.

By performing the above-described procedures, phase calculation for all of the pixels in the division area $S_{Xa}L_n$ to be scanned can be performed to acquire the vertical position $Y_{Qpq}$ equivalent to the absolute phase in the projection pattern 201.

In step S409, the three-dimensional shape calculation unit 108 calculates a three-dimensional shape of the object 101 by using the vertical position $Y_{Qpq}$ of the pixel $Q_{pq}$ existing in each division area $S_{Xa}L_n$. FIG. 12 schematically illustrates a case where the position of an arbitrary measuring point 1204 at the vertical position $Y_{Qpq}$ on the projection pattern 201 is measured by using a camera coordinate system 1202 in which a principal point position 1201 of the optical system of the camera 104 is an origin O (0, 0). A vertical position 1203 of the projection pattern 201 on the object 101 forms a line of intersection between a plane formed in three-dimensional space by the vertical position $Y_{Qpq}$ of the projection pattern 201 and the object 101. An optical cutting plane 1205 formed by the vertical position $Y_{Qpq}$ of the projection pattern 201 is pre-calibrated by using the camera coordinate system 1202 based on the following formula (8).

$$\alpha_{Ypq} x + \beta_{Ypq} y + \gamma_{Ypq} z + \epsilon_{Ypq} = 0 \quad \text{Formula (8)}$$

$\alpha_{Ypq}$, $\beta_{Ypq}$, $\gamma_{Ypq}$, and $\epsilon_{Ypq}$ are parameters representing the optical cutting plane 1205 in the three-dimensional space.

The three-dimensional position of the measuring point 1204 existing at the vertical position 1203 of the projection pattern 201 on the object 101 exists on a straight line 1208 represented by the following formula (9). In this case, the pixel $Q_{pq}$ ($Q_x$, $Q_y$, $-f$) of a projection point 1207 on an image 1206 captured by the camera 104 illustrated in FIG. 1 is used. The captured image 1206 illustrated in FIG. 12 has the same size as a projected image on an image sensor when the camera 104 illustrated in FIG. 1 is assumed to be a pinhole camera. Further, the captured image 1206 is in parallel with the xy plane of the camera coordinate system 1202, and the center of the captured image 1206 is disposed at a distance of −f (focal distance) from the origin O in the Z-axis direction.

$$x = -\frac{Q_x}{f} t$$
$$y = -\frac{Q_y}{f} t$$
$$z = t$$

Formula (9)

t indicates a parameter of an arbitrary real number. Since an intersection between the optical cutting plane 1205 represented by the formula (8) and the straight line 1208 represented by the formula (9) is the measuring point 1204, a position D ($D_x$, $D_y$, $D_z$) of the measuring point 1204 is represented by the following formula (10) in the camera coordinate system 1202.

$$D_x = -\frac{\varepsilon_{Ypq} Q_x}{\alpha_{Ypq} Q_x + \beta_{Ypq} Q_y - \gamma_{Ypq} f}$$
$$D_y = -\frac{\varepsilon_{Ypq} Q_y}{\alpha_{Ypq} Q_x + \beta_{Ypq} Q_y - \gamma_{Ypq} f}$$
$$D_z = -\frac{\varepsilon_{Ypq} f}{\alpha_{Ypq} Q_x + \beta_{Ypq} Q_y - \gamma_{Ypq} f}$$

Formula (10)

In step S410, the three-dimensional shape calculation unit 108 determines whether scanning is completed for all of the division areas $S_{X_a L_n}$ existing in the captured image 301. When scanning is completed (YES in step S410), the processing according to the present exemplary embodiment ends. Otherwise, when scanning is not completed (NO in step S410), the processing returns to step S406 to repeat scanning.

By performing steps S402 to S410 in this way to apply the vertical position $Y_{Qpq}$ on the projection pattern 201 to the corresponded pixel $Q_{pq}$ within the captured image 301, a three-dimensional shape of the entire object 101 can be obtained based on a set of the measuring points 1204.

Thus, according to the present exemplary embodiment, it is possible to measure a three-dimensional shape of an object with high density and high accuracy based on a captured image of the object on which a monochromatic pattern is projected.

Although the projection pattern 201 according to the present exemplary embodiment represents code information as the number of waves by using four code symbols representing 0 and 1, it may be possible to use other methods for robustly representing code information in a minimum area. For example, by representing a pseudo-random numerical sequence with multivalued code symbols, and comparing the numerical sequence with the numerical sequence of the acquired code symbols, code information can be obtained which can be robustly corresponded even if the number of acquired code symbols changes.

Other desirable exemplary embodiments of the present invention will be described below.

The overall configuration of an image information processing apparatus according to a second exemplary embodiment is basically the same as the configuration according to the first exemplary embodiment illustrated in FIG. 1.

Figure 13A:
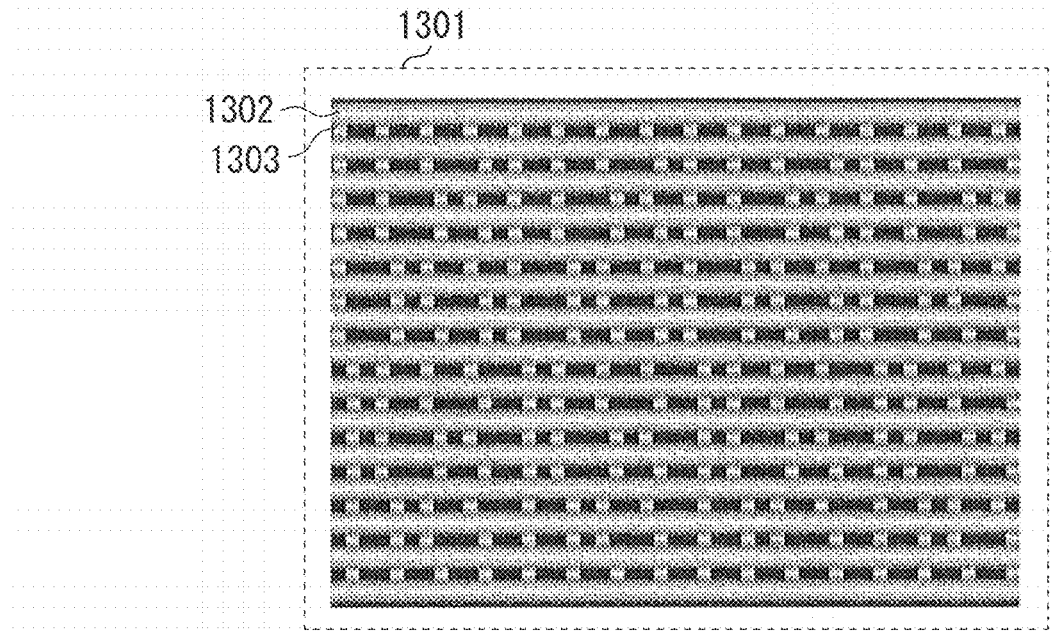
Figure 14A:
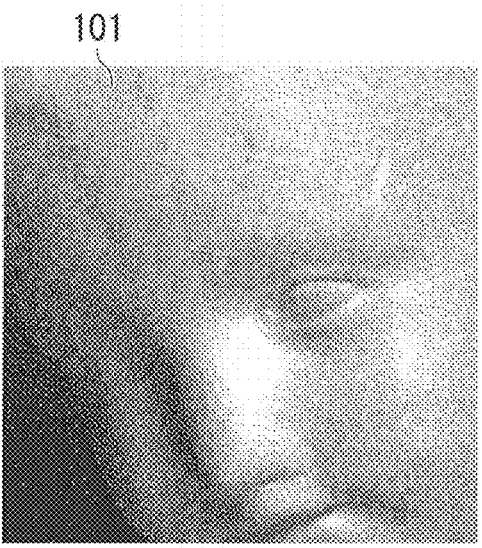
FIGS. 14A to 14C illustrate an object on which the projection pattern according to the second exemplary embodiment is projected.

However, instead of the projection pattern 201, a projection pattern 1301 illustrated in FIG. 13A is used as a projection pattern to be projected onto the measurement target object 101 by the projector 102. The camera 104 functions as an imaging unit for acquiring a captured image 1401 of a projection pattern illustrated in FIG. 14B projected onto the object 101 illustrated in FIG. 14A.

FIG. 15 is a flowchart illustrating processing according to the present exemplary embodiment. Processing in each step of the flowchart will be described below.

In step S1501, the projection pattern generation unit 103 generates data of the projection pattern 1301 illustrated in FIG. 13A according to the following rules.

The projection pattern 1301 is a monochromatic pattern including a measurement-waveform 1302 having a similar luminance variation to that in the measurement-waveform 202, and a plurality of code symbols 1303 having a luminance variation in the same direction as the measurement-waveform 1302, superimposed between the waves of the measurement-waveform 1302. Information used for corresponding the number of waves in the projection pattern 1301 is coded in the code symbols 1303.

Figure 13B:
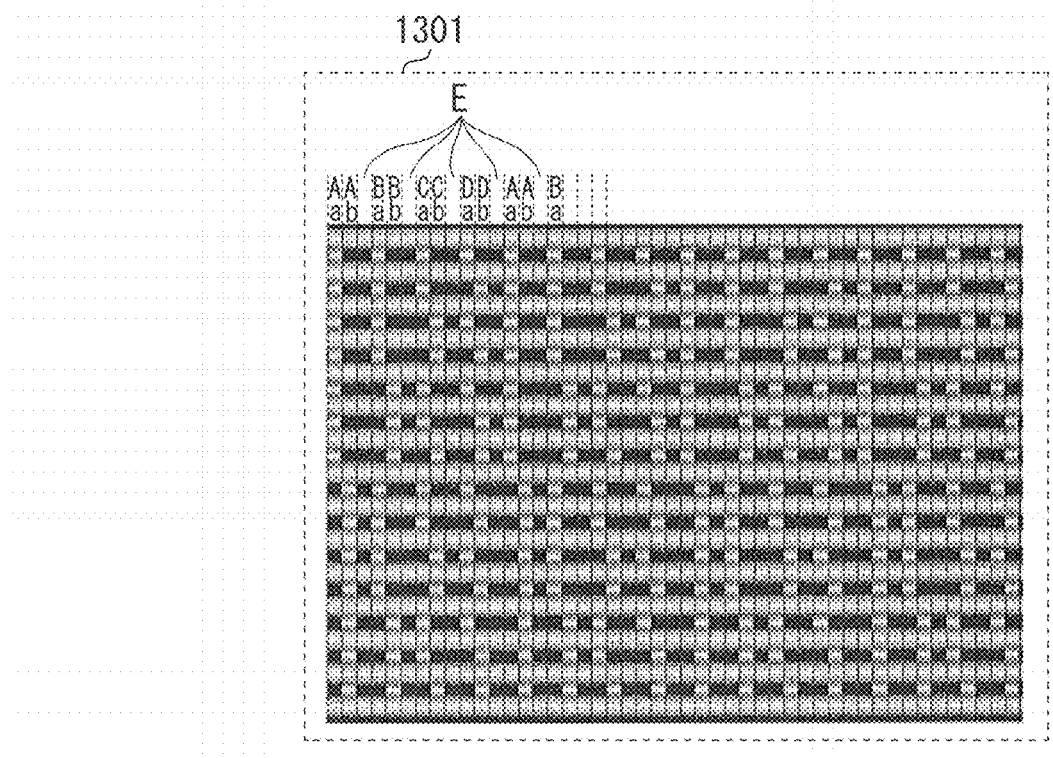

As illustrated in FIG. 13B, the projection pattern 1301 includes areas Aa, Ab, Ba, Bb, Ca, Cb, Da, and Db . . . repetitively arranged in this order in the horizontal direction, and a gap area E inserted between areas A, B, C, and D. A code symbol 1303 is arranged in a similar format to that of the code symbols 203 of the projection pattern 201 according to the first exemplary embodiment, and includes as code information the number of waves W (0 to 15) for the measurement-waveform peak right above the code symbol 1303 on the measurement-waveform 1302.

Further, as illustrated in FIG. 13C, the code symbol 1303 has a Gaussian functional continuous luminance variation which is steeper and thinner than the unit waveform of the measurement-waveform 1302. This luminance variation is detected to enable phase calculation (described below).

The projector 102 projects onto the object 101 the projection pattern 1301 (see FIG. 2A) generated in step S1501.

Figure 14B:
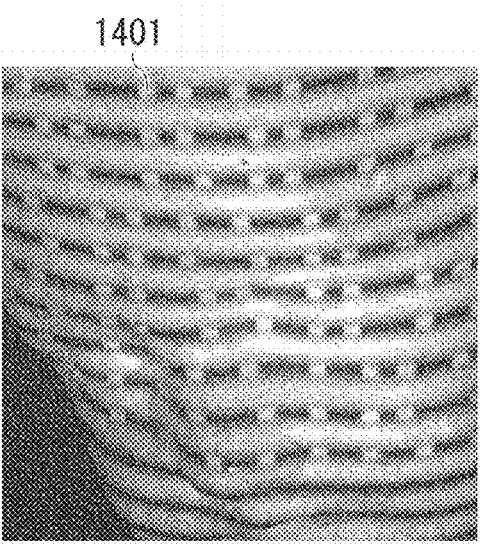
Figure 14C:
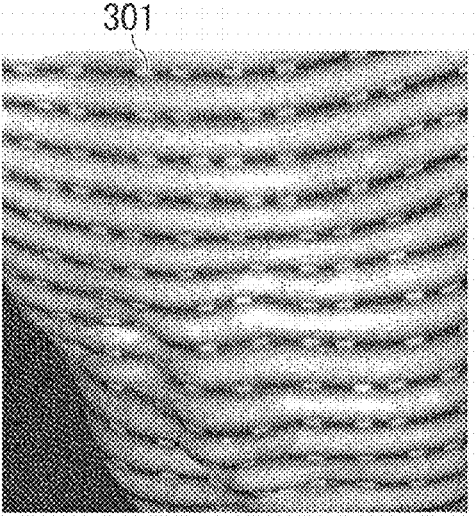

In step S1502, the camera 104 captures an image of the object 101, on which the projection pattern 1301 is projected, to acquire the captured image 1401 illustrated in FIG. 14B.

In step S1503, the projection pattern extraction unit 105 selectively extracts the measurement-waveform 1302 from the captured image 1401 (acquired in step S1503). Processing in step S1504 may be performed in a similar way to the processing in step S404 according to the first exemplary embodiment.

In step S1504, the projection pattern extraction unit 105 extracts code information from the captured image 1401 (acquired in step S1503) and the measurement-waveform 1302 (extracted in step S1503). Based on this code information, the measurement-waveform corresponding unit 106 correlates the number of waves between the measurement-waveform peak curve $L_n$ (extracted in step S1503) and each measurement-waveform peak curve in the captured image 1401. Processing in step S1505 may be performed in a similar way to the processing in step S405 according to the first exemplary embodiment. The code symbol 1303 according to the present exemplary embodiment is equivalent to the code symbol 203 in step S405.

By performing similar processing to step S405, for each measurement-waveform peak curve $L_n$, code information can be extracted from the code symbol 1303 to acquire the number of waves $W_{Ln}$ corresponding to measurement-waveform peaks in the projection pattern 1301.

In step S1505, the phase calculation unit 107 scans all of the division areas $S_{XxLn}$ (Xx=Aa, Ab, ..., Db, E) (acquired in step S1505) in the captured image 301.

In step S1506, the phase calculation unit 107 determines whether the code symbol 1303 exists in the division area $S_{XxLn}$ (Xx=Aa, Ab, ..., Db) to be scanned. To determine whether the code symbol 1303 exists, the phase calculation unit 107 compares the average luminance of the division area $S_{XaLn}$ with that of the division area $S_{XaLn}$. When the average luminance of the division area $S_{XaLn}$ is higher than that of the division area $S_{XbLn}$, the phase calculation unit 107 determines that the code symbol 1303 exists in the division area $S_{XaLn}$. Otherwise, when the average luminance of the division area $S_{XbLn}$ is higher than that of the division area $S_{XaLn}$, the phase calculation unit 107 determines that the code symbol 1303 exists in the division area $S_{XbLn}$. As described above, the phase calculation unit 107 identifies the projecting positions of the code symbols 1303 in units of division areas. When the code symbol 1303 does not exist (NO in step S1506), the processing proceeds to step S1507. Otherwise, when the code symbol 1303 exists (YES in step S1506), the processing proceeds to step S1508.

In step S1507, the phase calculation unit 107 performs phase calculation in the division area $S_{XaLn}$ where the code symbol 1303 does not exist to acquire the vertical position $Y_{Qpq}$ equivalent to the absolute phase in the projection pattern 1301. Processing in step S1508 may be performed in a similar way to the processing in step S408 according to the first exemplary embodiment.

By performing similar processing to step S408, phase calculation can be performed on all of the pixels in the division area $S_{XaLn}$ to be scanned, to acquire the vertical position $Y_{Qpq}$ equivalent to the absolute phase in the projection pattern 1301.

In step S1508, the phase calculation unit 107 performs phase calculation in the division area $S_{XaLn}$ where the code symbol 1303 exists to acquire the vertical position $Y_{Qpq}$ equivalent to the absolute phase in the projection pattern 1301.

Processing for performing phase calculation in the division area $S_{XaLn}$ in step S1509 is similar to the processing of the flowchart illustrated in FIG. 11 according to the first exemplary embodiment. Processing in step S1509 will be described below with reference to the step number of the flowchart.

In step S1101, the phase calculation unit 107 divides the division area $S_{XaLn}$ into pixel sequences in the vertical direction, and scans each pixel sequence as a scanning line $V_p$ (P=1, 2, 3, ..., $p_{max}$) r where $p_{max}$ indicates the horizontal pixel width of the division area $S_{XaLn}$.

In step S1102, the phase calculation unit 107 sets a luminance $B_{upp}$ of an upper end pixel $Q_{upp}$, a luminance $B_{downp}$ of a lower end pixel $Q_{downp}$, and a pixel $Q_{codep}$ for the luminance peak of the code symbol 1303 in the scanning line $V_p$ to be scanned. The phase calculation 107 sets a luminance $B_{upminp}$ of a minimum luminance pixel $Q_{upminp}$ above the pixel $Q_{codep}$, and a luminance $B_{downminp}$ of a minimum luminance pixel $Q_{downminp}$ below the pixel $Q_{codep}$. The phase calculation unit 107 assigns these values to the following formulas (11) and (12) to convert the luminance $B_{pq}$ (q=1, 2, 3, ..., $q_{max}$) of the pixel $Q_{pq}$ constituting the scanning line $V_p$ into a normalized luminance $B_{npq}$, where $q_{max}$ indicates the number of pixels of the scanning line $V_p$.

When $Q_{upp} \leq Q_{pq} \leq Q_{codep}$ $$B_{npq} = \frac{B_{pq} - B_{upminp}}{B_{upp} - B_{upminp}}$$ Formula 11

When $Q_{codep} < Q_{pq} \leq Q_{downp}$ $$B_{npq} = \frac{B_{pq} - B_{downminp}}{B_{downp} - B_{downminp}}$$ Formula 12

In step S1103, the phase calculation unit 107 calculates relative phases 0 to π [rad] on the scanning line $V_p$ to be scanned, to acquire the vertical position $Y_{Qpq}$ equivalent to the absolute phase in the projection pattern 1301. On the premise that the surface color of the object is constant within the range of the scanning line $V_p$, the normalized luminance $B_{npq}$ obtained in step S1102 equals the luminance value of a luminance function $B_t = F(θ)$ for the division area $S_{XaLn}$ including the code symbol 1303 of the projection pattern 1301 as illustrated in FIG. 16. Therefore, within the phase range from 0 to π, the relative phase value $θ_{Qpq}$ [rad] on the pixel $Q_{pq}$ is represented by the following formula (13).

$$θ_{Qpq} = F^{-1}(B_{npq})$$ Formula 13

Figure 16A:
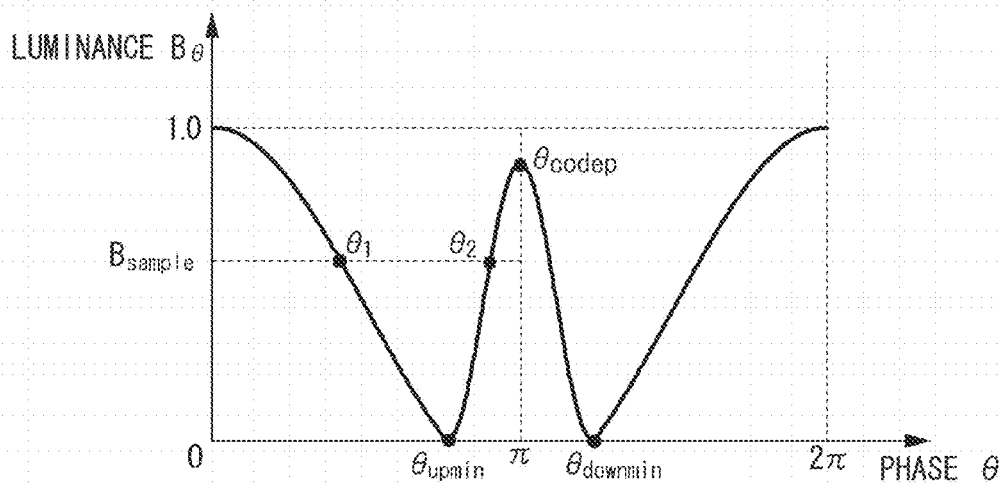
FIGS. 16A and 16B illustrate a luminance function $B_\theta = F(\theta)$ and a luminance differential function $\Delta B_\theta = F'(\theta)$, respectively, for a division area $S_{X_a L_n}$ including code symbols according to the second exemplary embodiment.

When $0 \leq θ_{Qpq} < π$, by acquiring in advance the luminance function $B_t = F(θ)$ from the projection pattern 1301, prestoring the luminance function, and assigning the normalized luminance $B_{npq}$ to the formula (13), the relative phase value $θ_{Qpq}$ can be obtained. However, as illustrated in FIG. 16A, when an arbitrary luminance $B_{sample}$ is assigned $B_{npq}$, the relative phase value cannot be uniquely determined, i.e., there are two different solution candidates $θ_1$ and $θ_2$. Therefore, by using the following formula (14), the phase calculation unit 107 determines the position of the relative phase value $θ_{Qpq}$ based on the sign of the differential luminance value $\Delta B_t = F'(θ)$, as illustrated in FIG. 16B.

$$\begin{cases} θ_{Qpq} \leq θ_{upmin}(\Delta B_t \leq 0) \\ θ_{Qpq} > θ_{upmin}(\Delta B_t > 0) \end{cases}$$ Formula 14

$θ_{upmin}$ indicates a relative phase value which provides the minimum luminance in an area sandwiched between the code symbol 1303 and the upper measurement-waveform 1302 existing in the projection pattern 1301.

Figure 16B:
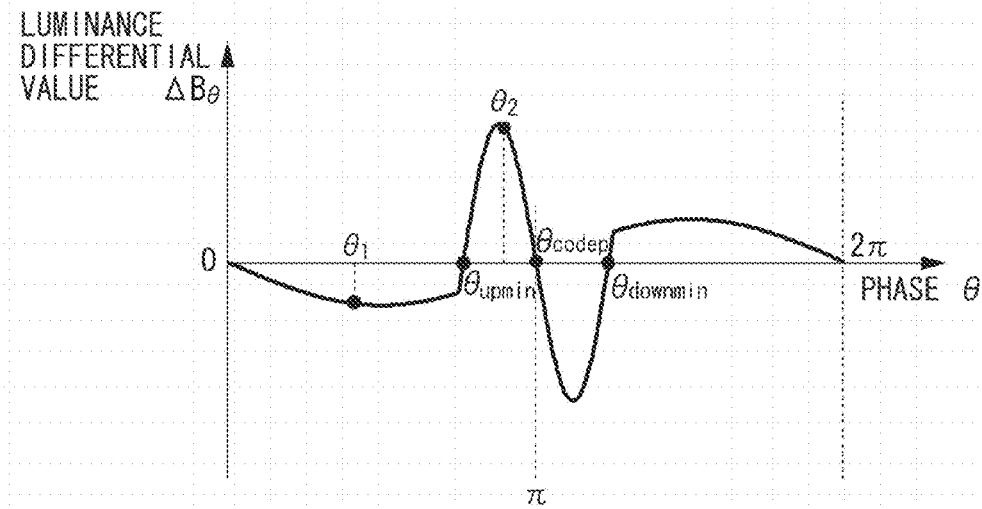

The differential luminance value $\Delta B_t$ has different signs even with the same luminance value, as with $θ_1$ and $θ_2$ illustrated in FIG. 16B. Therefore, by making the determination based on the formula (14), the relative phase value $θ_{Qpq}$ can be uniquely calculated.

Based on the obtained relative phase value $θ_{Qpq}$ and the number of waves $W_{Ln}$ in the measurement-waveform peak area right above the division area $S_{XaLn}$ including the scanning line $V_p$, the vertical position $Y_{Qpq}$ of an arbitrary pixel $Q_{pq}$ on the projection pattern 1301 is similarly represented by the formula (6) according to the first exemplary embodiment.

By performing the calculation based on the formula (6), the vertical position of an arbitrary pixel $Q_{pq}$ can be obtained within the relative phase range from 0 to π on the scanning line $V_p$.

In step S1104, the phase calculation unit 107 calculates relative phases π to 2π [rad] on the scanning line $V_p$ to be scanned, to acquire the vertical position $Y_{Qpq}$ equivalent to the absolute phase in the projection pattern 201. Similar to step S1103, the normalized luminance $B_{npq}$ (obtained in step S1102) is represented by the formula (15) based on the luminance function $B_\theta = F(\theta)$ for the division area $S_{X_aL_n}$.

$$\theta_{Qpq} = F^{-1}(B_{npq}) \qquad \text{Formula 15}$$

When $\pi \leq \theta_{Qpq} < 2\pi$, also in step S1104, the relative phase value cannot be uniquely determined, i.e., there are two different solution candidates. Therefore, by using the following formula (16), the phase calculation unit 107 determines the position of the relative phase value $\theta_{Qpq}$ based on the sign of the differential luminance value $\Delta B_t = F'(\theta)$, as illustrated in FIG. 16B.

$$\begin{cases} \theta_{Qpq} \leq \theta_{downmin} & (\Delta B_t \geq 0) \\ \theta_{Qpq} > \theta_{downmin} & (\Delta B_t < 0) \end{cases} \qquad \text{Formula 16}$$

$\theta_{downmin}$ indicates a relative phase value which provides the minimum luminance in an area sandwiched between the code symbol 1303 and the upper measurement-waveform 1302 existing in the projection pattern 1301.

By performing the determination based on the formula (16), the relative phase value $\theta_{Qpq}$ can be uniquely calculated.

Based on the obtained relative phase value $\theta_{Qpq}$ and the number of waves $W_{Ln}$ in the measurement-waveform peak area right above the division area $S_{X_aL_n}$ including the scanning line $V_p$, the vertical position $Y_{Qpq}$ of an arbitrary pixel $Q_{pq}$ on the projection pattern 1301 is similarly represented by the formula (6) according to the first exemplary embodiment. By performing calculation based on the formula (6), the vertical position of an arbitrary pixel $Q_{pq}$ can be acquired within the relative phase range from $\pi$ to $2\pi$ on the scanning line $V_p$.

In step S1105, the phase calculation unit 107 determines whether scanning is completed for all of the scanning lines $V_p$ existing in the division area $S_{X_aLn}$. When scanning is completed (YES in step S1105), the processing in step S1509 ends. Otherwise, when scanning is not completed (NO in step S1105), the processing returns to step S1101 to repeat scanning.

In step S1510, the three-dimensional shape calculation unit 108 calculates a three-dimensional shape of the object 101 by using the vertical position $Y_{Qpq}$ of the pixel $Q_{pq}$ existing in each division area $S_{X_aL_n}$. Processing in step S1510 may be performed in a similar way to the processing in step S409 according to the first exemplary embodiment.

In step S1510, the three-dimensional shape calculation unit 108 determines whether scanning is completed for all of the division areas $S_{X_aL_n}$ existing in the captured image 1401. When scanning is completed (YES in step S1510), the processing according to the present exemplary embodiment ends. Otherwise, when scanning is not completed (NO in step S1510), the processing returns to step S1505 to repeat scanning.

By performing steps S1502 to S1510 in this way to apply the vertical position $Y_{Qpq}$ on the projection pattern 1301 to the corresponded pixel $Q_{pq}$ in the captured image 1401, a three-dimensional shape of the entire object 101 can be obtained based on a set of the measuring points 1204.

Thus, according to the present exemplary embodiment, it is possible to measure a three-dimensional shape of an object, including an area where a code symbol exists, with high density and high accuracy based on a captured image of the object on which a monochromatic pattern is projected.

Although, in the present exemplary embodiment, each code symbol has a Gaussian functional continuous luminance variation which is thinner than a measurement-waveform, the code symbol configuration is not limited thereto. It is also possible to use other waveforms easily recognizable as a code, which enables robust symbol detection not easily affected by the object shape, and high-accuracy phase calculation. For example, a saw-tooth waveform having a linear luminance variation still thinner than that according to the present exemplary embodiment, and having a luminance peak higher than the measurement-waveform may be used to maintain detectable contrast of the code symbols even if a defocused state is produced by change in distance from the object 101.

Another desirable exemplary embodiment of the present invention will be described below.

The overall configuration of an image information processing apparatus according to a third exemplary embodiment is basically similar to the configuration according to the first exemplary embodiment illustrated in FIG. 1.

Figure 17A:
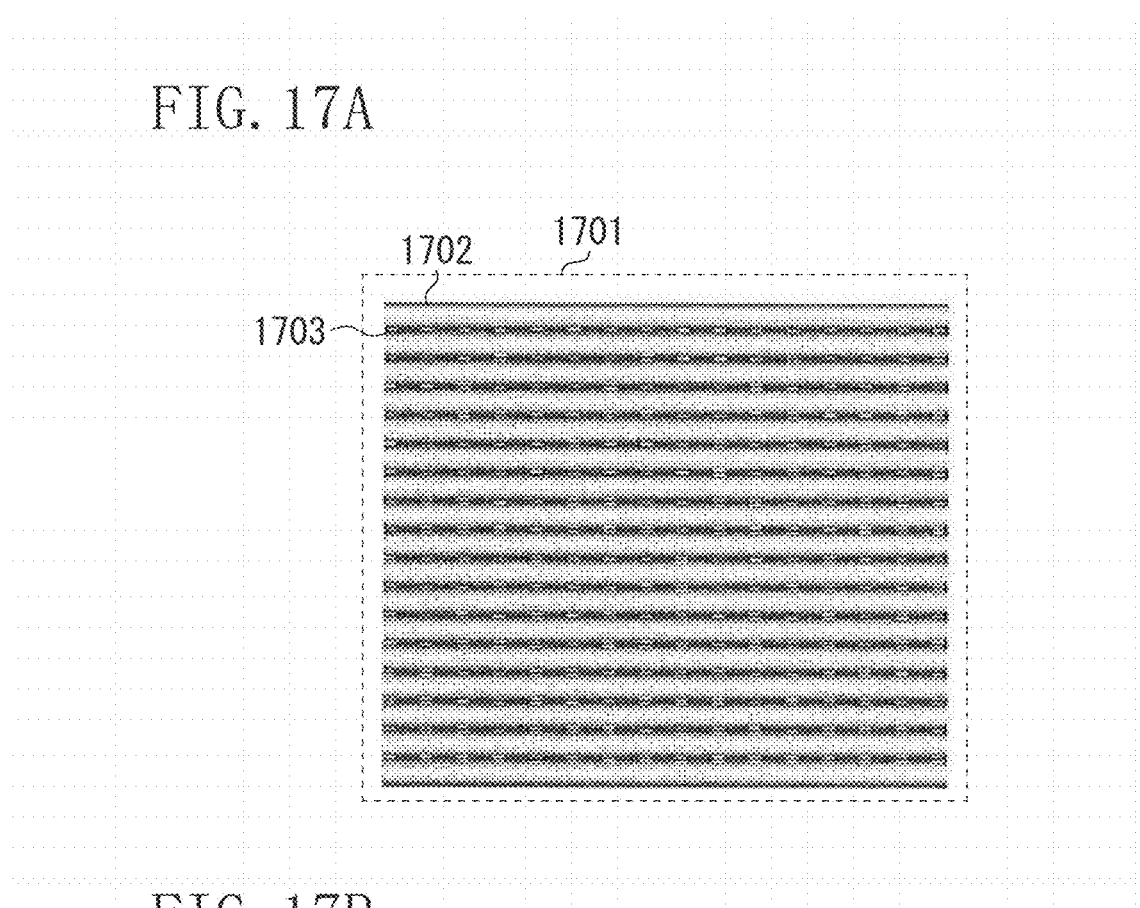
FIGS. 17A to 17D illustrates a projection pattern according to a third exemplary embodiment.

However, instead of the projection pattern 201, the projector 102 projects a projection pattern 1701 illustrated in FIG. 17A onto the object 101 under measurement.

Figure 18A:
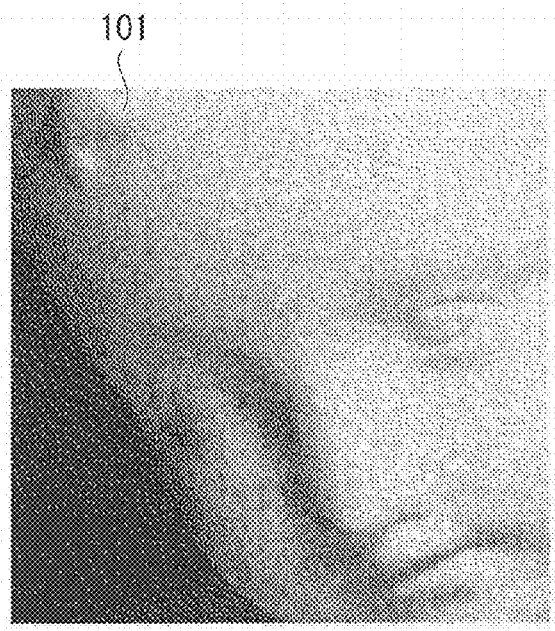
FIGS. 18A and 18B illustrate an object on which the projection pattern according to the third exemplary embodiment is projected.
Figure 18B:
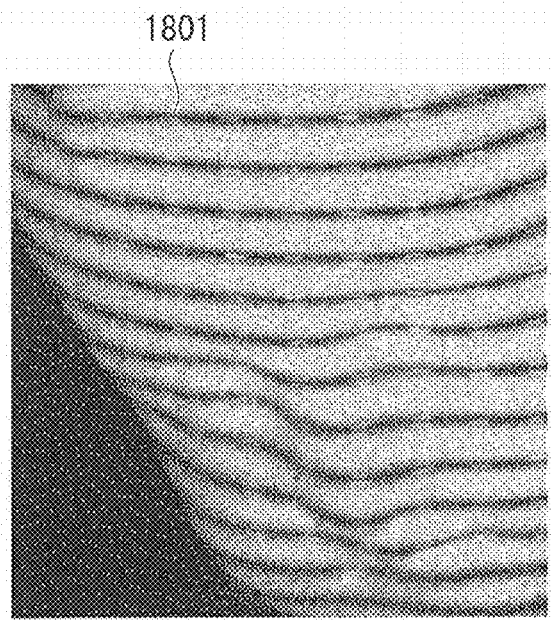

The camera 104 serves as an imaging unit for acquiring a captured image 1801 of a projection pattern 1801 illustrated in FIG. 18B projected onto the object 101 illustrated in FIG. 18A.

Figure 19:
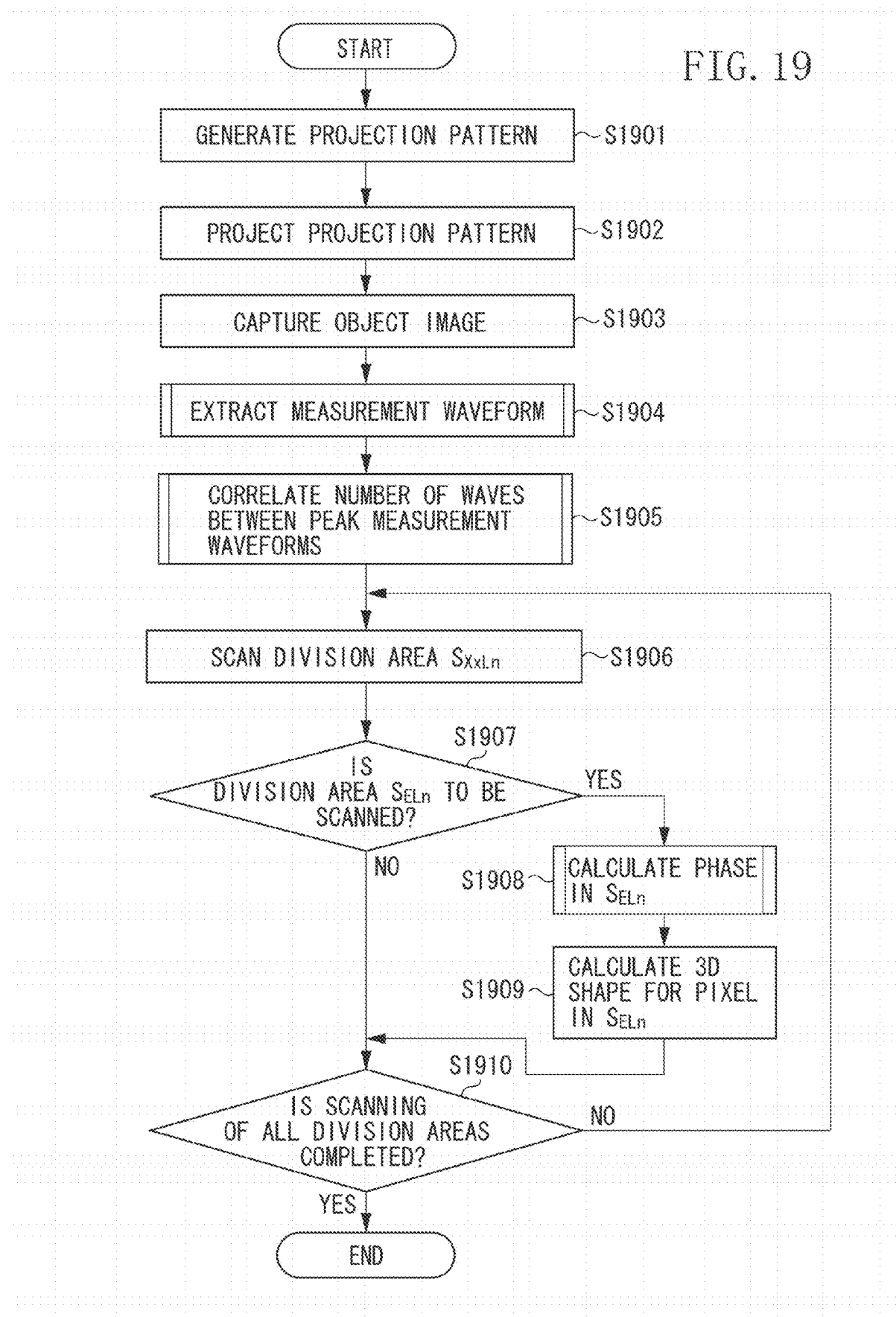
FIG. 19 is a flowchart illustrating processing according to the third exemplary embodiment.

FIG. 19 is a flowchart illustrating processing according to the present exemplary embodiment. Processing in each step of the flowchart will be described below.

In step S1901, the projection pattern generation unit 103 generates data of the projection pattern 1701 illustrated in FIG. 17A according to the following rules.

The projection pattern 1701 is a monochromatic pattern including a measurement-waveform 1702 having a similar luminance variation to that in the measurement-waveform 202, and a plurality of short horizontal linear code symbols 1703 superimposed between the waves of the measurement-waveform 1702. Information used for corresponding the number of waves in the projection pattern 1701 is coded in the code symbols 1703.

The projection pattern 1701 includes areas A, B, C, and D . . . repetitively arranged in this order in the horizontal direction, and a gap area E inserted between the areas A, B, C, and D. A short horizontal linear code symbol 1703 is arranged in between measurement-waveform peak positions, in units of the areas A to D, and includes as code information the number of waves W (0 to 15) for the measurement-waveform peak right above the code symbol 1703 on the measurement-waveform 1702.

Specifically, each of the areas A, B, C, and D represents a binary digit (0 or 1), and the areas A, B, C, and D collectively represent a 4-digit binary number. When one code symbol 1703 exists in each area X (X=A, B, C, D), the relevant binary digit represents 0. When two code symbols 1703 exist in each code area X, the relevant binary digit represents 1. FIG. 17C illustrates a luminance variation in an area where one code symbol 1703 exists, assuming that the peak position of the measurement-waveform 1702 corresponds to phase 0 on the horizontal axis, and the adjacent lower peak position of the measurement-waveform 1702 corresponds to phase $2\pi$ thereon. FIG. 17D illustrates a luminance variation in an area where two code symbols 1703 exist.

Figure 17B:
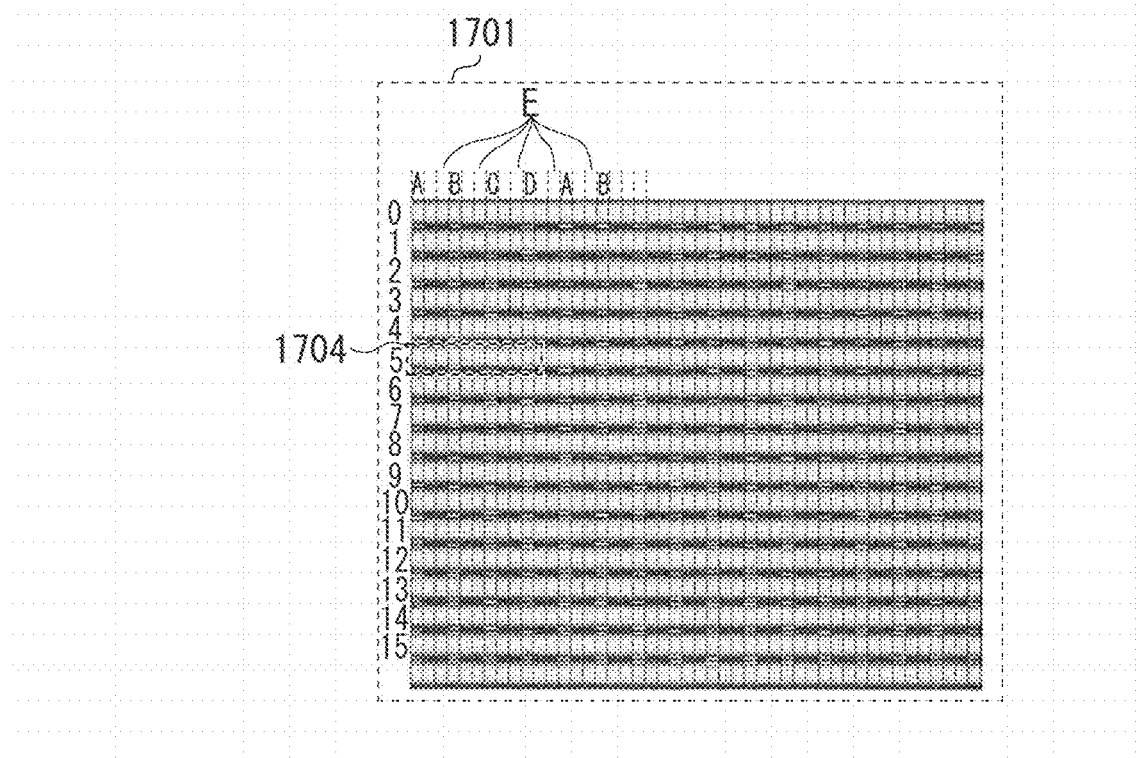
Figure 17C:
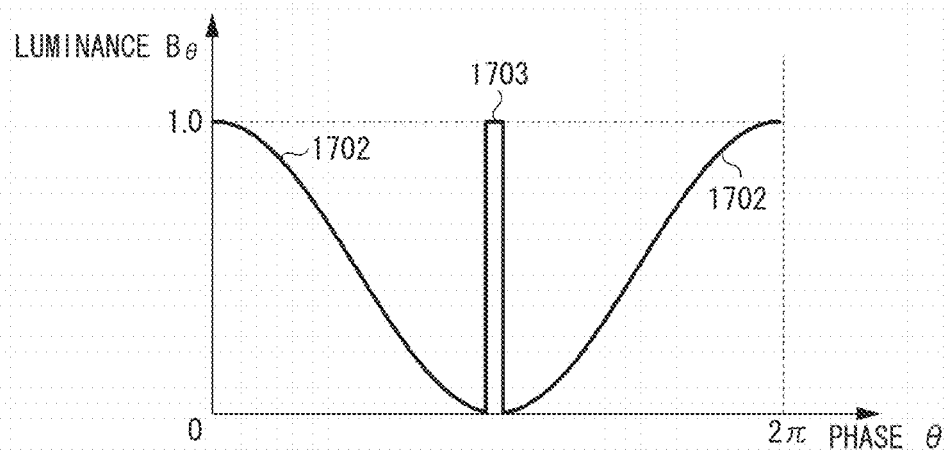
Figure 17D:
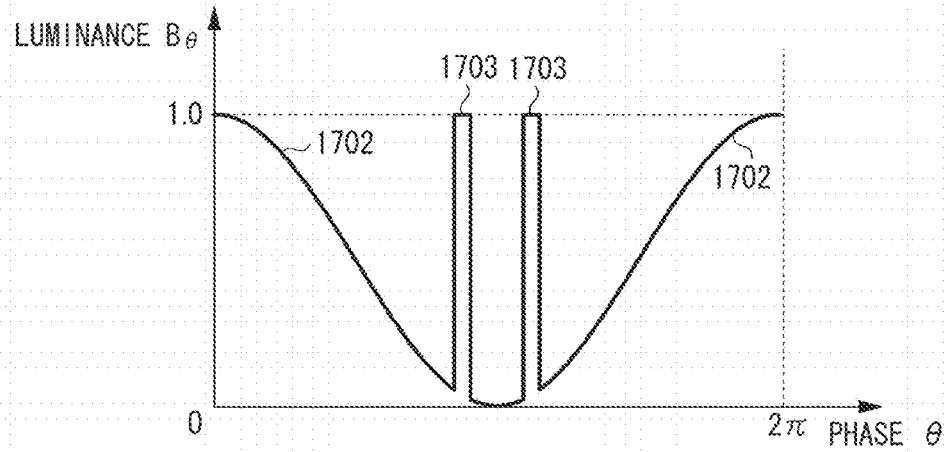

For example, referring to an area 1704 illustrated in FIG. 17B, since the code symbol 1703 exists in the areas A, B, C, and D, the 4-digit binary number is 0101. The binary number 0101 is converted into a decimal number W of 5.

A gap area E is arranged between the areas A, B, C, and D to prevent mis-detection due to noise. The code symbol 1703 does not exist in the gap area E.

In step S1902, the projector 102 projects the projection pattern 1701 illustrated in FIG. 17A (generated in step S1901) onto the object 101.

In step S1903, the camera 104 captures an image of the object 101, on which the projection pattern 1701 is projected, to acquire the captured image 1801 illustrated in FIG. 18.

In step S1904, the projection pattern extraction unit 105 selectively extracts the measurement-waveform 1702 from the captured image 1801 (acquired in step S1903). Processing in step S1904 may be performed in a similar way to the processing in step S404 according to the first exemplary embodiment.

In step S1905, the measurement-waveform corresponding unit 106 extracts code information from the captured image 1801 (acquired in step S1903) and the measurement-waveform peak curve $L_n$ (extracted in step S1904). Based on this code information, the measurement-waveform corresponding unit 106 corresponds the number of waves between the measurement-waveform peak curve $L_n$ (extracted in step S1904) and each measurement-waveform peak curve in the captured image 1801.

FIG. 20 is a flowchart illustrating processing for extracting code information and corresponding the number of waves for the measurement-waveform peak curve $L_n$ on the captured image in step S1905. Processing in step S1905 will be described below with reference to the step number of the flowchart.

In step S2001, the measurement-waveform corresponding unit 106 divides the captured image 1801 (acquired in step S1903) in the vertical and horizontal directions into the following areas.

As first division, the measurement-waveform corresponding unit 106 divides the captured image 1801 in the vertical direction. As illustrated in FIG. 17B, the projection pattern 1701 includes areas A, B, C, and D repetitively arranged in this order in the horizontal direction, and a gap area E inserted between the areas A, B, C, and D . . . . In the present exemplary embodiment, the optical axis of the camera 104 and the optical axis of the projector 102 are in parallel, and arranged almost perpendicularly to the object 101. This arrangement makes the division areas A to D of the projection pattern 1701 constant, regardless of the shape of the object 101, even in the captured image 1801. The division areas A to D in the captured image 1801 are prestored, and the captured image 1801 is divided in the vertical direction.

As second division, the measurement-waveform corresponding unit 106 divides the captured image 1801 in the horizontal direction. Specifically, the measurement-waveform corresponding unit 106 divides an area enclosed by an arbitrary measurement-waveform peak curve $L_n$ (extracted in step S1904) and the closest lower measurement-waveform peak curve $L_{n+1}$.

The measurement-waveform corresponding unit 106 acquires as division area $S_{XLn}$, (X=A, B, D, E) the captured image 1801 to which the above-described first and second divisions have been applied. The measurement-waveform corresponding unit 106 does not divide an area where either the measurement-waveform peak curve $L_n$ or $L_{n+1}$ is discontinuous in the middle of a division unit in the vertical direction, and excludes such an area from subsequent processing.

In step S2002, the measurement-waveform corresponding unit 106 scans all of the measurement-waveform peak curves $L_n$ in the captured image 1801 (acquired in step S1904).

In step S2003, the measurement-waveform corresponding unit 106 determines whether all of the division areas $S_{ALn}$ to $S_{DLn}$ exist in an area enclosed by the measurement-waveform peak curve $L_n$ to be scanned and the measurement-waveform peak curve $L_{n+1}$. As described above, the areas A to D repetitively appear. Therefore, if these areas appear at least once, all of the division areas $S_{ALn}$ to $S_{DLn}$ are determined to exist. When all of the division areas $S_{ALn}$ to $S_{DLn}$ exist (YES in step S2003), the processing proceeds to step S2004. Otherwise, when not all of the division areas $S_{ALn}$ to $S_{DLn}$ exist (NO in step S2003), the processing returns to step S2002.

In step S2004, the measurement-waveform corresponding unit 106 initializes to 0 the number of waves $W_{Ln}$ on the measurement-waveform in a projected image 1901 of the measurement-waveform peak curve $L_n$. As described above, the number of waves $W_{Ln}$ is equivalent to the code information.

Figure 21A:
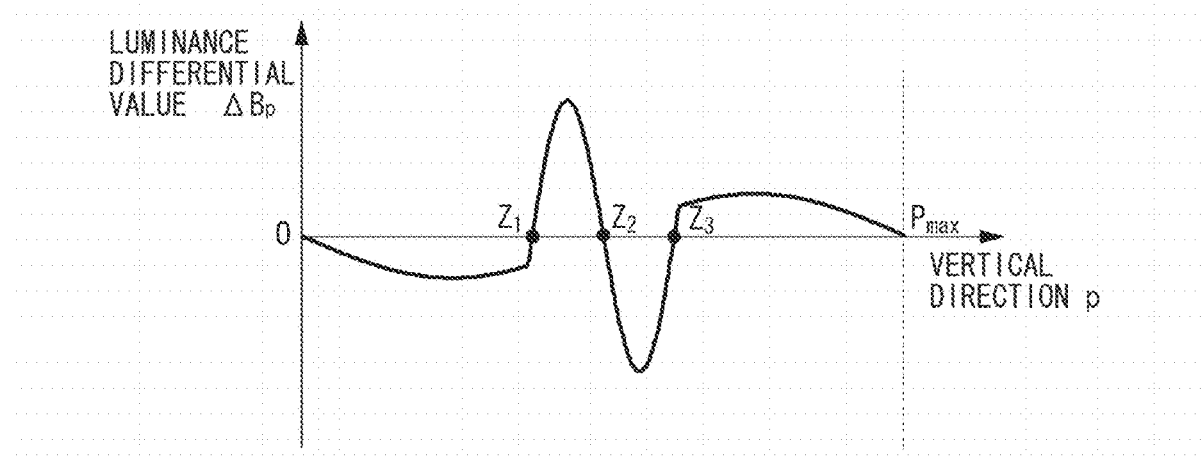
FIGS. 21A and 21B respectively illustrate a luminance differential function $\Delta B_p$ when one code symbol exists and a luminance differential function $\Delta B_p$ when two code symbols exist according to the third exemplary embodiment.
Figure 21B:
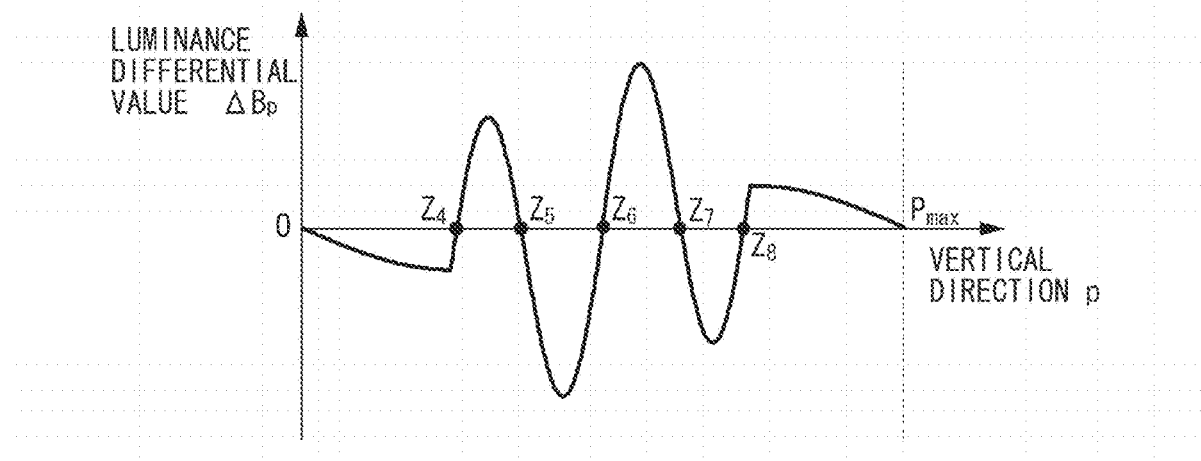

In step S2005, the measurement-waveform corresponding unit 106 counts the number of code symbols 1703 in the division area $S_{ALn}$ in the captured image 1801. To count the number of code symbols 1703, the measurement-waveform corresponding unit 106 may differentiate the luminance value $B_p$ of each pixel in the division area $S_{ALn}$ in the vertical direction p, and count the number of zero points. As indicated by the luminance differential value $\Delta B_p$ illustrated in FIG. 21A, the number of code symbols 1703 is 1 when the number of zero points is three ($Z_1$ to $Z_3$). As indicated by the luminance differential value $\Delta B_p$ illustrated in FIG. 21B, the number of code symbols 1703 is 2 when the number of zero points is five ($Z_4$ to $Z_8$). When the number of code symbols 1703 is determined to be 2 (2 in step S2005), the processing proceeds to step S2006. Otherwise, when the number of code symbols 1703 is determined to be 1 (1 in step S2005), i.e., in the case of 3 zero points, the processing proceeds to step S2007.

In step S2006, the measurement-waveform corresponding unit 106 adds 8 (equivalent to a binary number 1000) to the number of waves $W_{Ln}$.

In step S2007, the measurement-waveform corresponding unit 106 counts the number of code symbols 1703 in the division area $S_{BLn}$ in the captured image 1801. Processing in step S2007 may be performed in a similar way to the processing for counting the number of code symbols 1703 in the division area $S_{ALn}$ in step S2005. When the number of code symbols 1703 is determined to be 2 (2 in step S2007), the processing proceeds to step S2008. Otherwise, when the number of code symbols 1703 is determined to be 1 (1 in step S2007), i.e., in the case of 3 zero points, the processing proceeds to step S2009.

In step S2008, the measurement-waveform corresponding unit 106 adds 4 (equivalent to a binary number 0100) to the number of waves $W_{Ln}$.

In step S2009, the measurement-waveform corresponding unit 106 counts the number of code symbols 1703 in the division area $S_{CLn}$ in the captured image 1801. Processing in step S2009 may be performed in a similar way to the processing for counting the number of code symbols 1703 in the division area $S_{ALn}$ in step S2005. When the number of code symbols 1703 is determined to be 2 (2 in step S2009), the processing proceeds to step S2010. Otherwise, when the number of code symbols 1703 is determined to be 1 (1 in step S2009), i.e., in the case of 3 zero points, the processing proceeds to step S2011.

In step S2010, the measurement-waveform corresponding unit 106 adds 2 (equivalent to a binary number 0010) to the number of waves $W_{Ln}$.

In step S2011, the measurement-waveform corresponding unit 106 counts the number of code symbols 1703 in the division area $S_{DLn}$ in the captured image 1801. Processing in step S2011 may be performed in a similar way to the processing for counting the number of code symbols 1703 in the division area $S_{ALn}$ in step S2005. When the number of code symbols 1703 is determined to be 2 (2 in step S2011), the processing proceeds to step S2012. Otherwise, when the number of code symbols 1703 is determined to be 1 (1 in step S2011), i.e., in the case of 3 zero points, the processing proceeds to step S2013.

In step S2012, the measurement-waveform corresponding unit 106 adds 1 (equivalent to a binary number 0001) to the number of waves $W_{Ln}$.

In step S2013, the measurement-waveform corresponding unit 106 determines whether scanning is completed for all of the measurement-waveform peak curves $L_n$ existing in the captured image 1801. When scanning is completed (YES in step S2013), the processing in step S1905 ends. Otherwise, when scanning is not completed (NO in step S2013), the processing returns to step S2002 to repeat scanning.

By performing the above procedures, for each measurement-waveform peak curve $L_n$, code information can be extracted from the code symbol 1703 to acquire the number of waves $W_{Ln}$ corresponding to measurement-waveform peaks in the projection pattern 1701.

In step S1906, the phase calculation unit 107 scans all of the division areas $S_{XLn}$ in the captured image 1801 (X=A, B, D, E) (acquired in step S1902).

In step S1907, the phase calculation unit 107 determines whether the division area $S_{XLn}$ to be scanned (X=A, B, D, E) is $S_{ELn}$ to identify the projecting position of the code symbol 1703 in units of division areas. When the division area $S_{XLn}$ to be scanned is $S_{ELn}$ (YES in step S1907), the code symbol 1703 is determined not to be included, and the processing proceeds to step S1908. Otherwise (NO in step S1907), the code symbol 1703 is determined to be included, and the processing proceeds to step S1910.

In step S1908, the phase calculation unit 107 performs phase calculation in the division area $S_{ELn}$ to be scanned, to acquire the vertical position $Y_{Qpq}$ equivalent to the absolute phase in the projection pattern 1701. Processing in step S1908 may be performed in a similar way to the phase calculation in the division area $S_{XxLn}$ in step S408 according to the first exemplary embodiment. By performing similar processing to step S407, a phase calculation can be made for all of the pixels in the division area $S_{ELn}$ to be scanned, to acquire the vertical position $Y_{Qpq}$ equivalent to the absolute phase in the projection pattern 1701.

In step S1909, the three-dimensional shape calculation unit 108 calculates a three-dimensional shape of the object 101 by using the vertical position $Y_{Qpq}$ of the pixel $Q_{pq}$ existing in each division area $S_{ELn}$. Processing in step S1909 may be performed in a similar way to the calculation of the three-dimensional shape in the division area $S_{XxLn}$ in step S409 according to the first exemplary embodiment.

In step S1910, the three-dimensional shape calculation unit 108 determines whether scanning is completed for all of the division areas $S_{XLn}$ existing in the captured image 1801. When scanning is completed (YES in step S1910), the processing according to the present exemplary embodiment ends. Otherwise, when scanning is not completed (NO in step S1910), the processing returns to step S1906 to repeat scanning.

By performing steps S1902 to S2009 in this way to apply the vertical position $Y_{Qpq}$ on the projection pattern 1701 to the corresponded pixel $Q_{pq}$ in the captured image 1801, a three-dimensional shape of the entire object 101 can be obtained based on a set of the measuring points 1204.

Thus, according to the present exemplary embodiment, it is possible to measure a three-dimensional shape of an object with less overlooked measurement areas and with higher density and higher accuracy than in the first exemplary embodiment based on a captured image of the object on which a monochromatic pattern is projected.

In the present exemplary embodiment, code symbols 1703 are linear symbols, and information coding is performed based on the number of code symbols 1703. However, the code symbol configuration is not limited thereto as long as a code sequence used includes code symbols 1703 each being composed of at least two, of binary or more multi-values. It is also possible to use other information coding methods in which code symbol recognition is easy and coding is hardly affected by the object shape. For example, when information coding is performed based on high and low luminance values, a constant magnitude of code symbols 1703 can be maintained. Therefore, the above-described code symbol configuration is effective even if the number of code symbols 1703 cannot be recognized because of a defocused state produced by change in distance from the object.

Still another desirable exemplary embodiment of the present invention will be described below.

Figure 22:
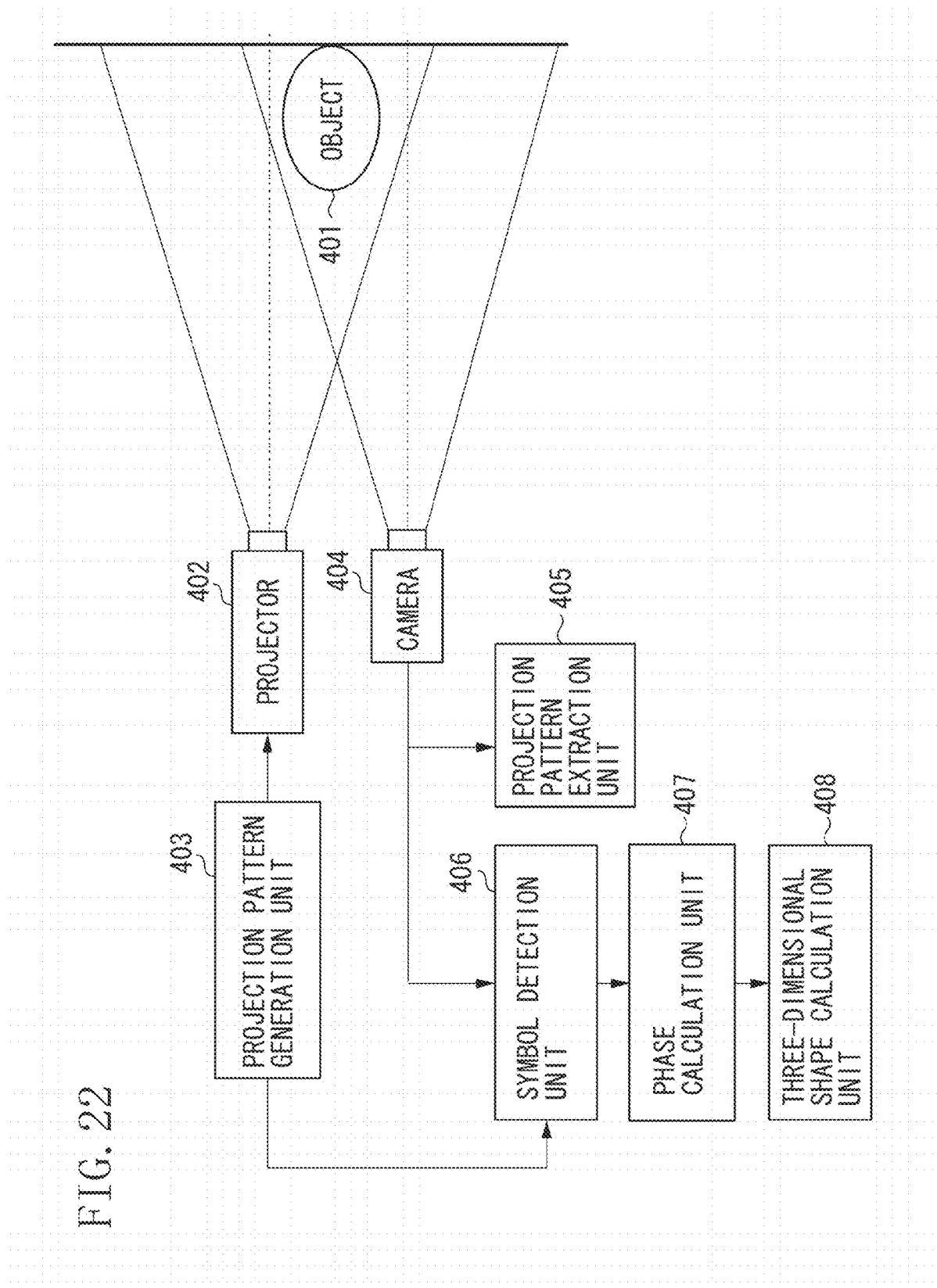
FIG. 22 illustrates an overall configuration of an apparatus according to a fourth exemplary embodiment.

A three-dimensional shape measuring apparatus according to a fourth exemplary embodiment is directed to measuring the surface shape of an object, and has a configuration illustrated in FIG. 22. However, the configuration illustrated in FIG. 22 is only an example, and various modifications are possible. For example, some constituent elements may be integrated into one constituent element, or one constituent element may be divided into a plurality of constituent elements.

A projector 402 functions as a projection unit for projecting a projection pattern on an object 401 to be measured. This projection pattern may be prestored in a memory in the projector 402, or generated and supplied by a projection pattern generation unit (described below), or supplied from an external device (not illustrated) to the projector 402.

Figure 23A:
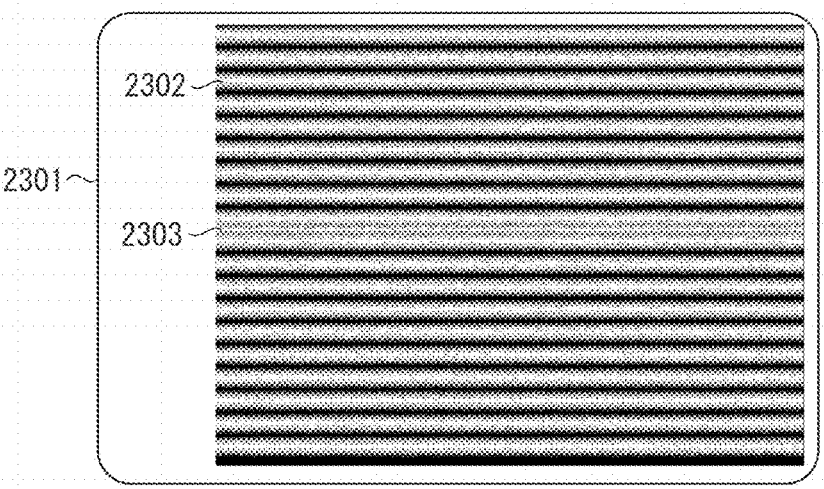

FIG. 23A illustrates a configuration of a projection pattern 2301 to be used for the present exemplary embodiment. The projection pattern 2301 to be used for the present exemplary embodiment has the following configuration. A measurement-waveform 2302 (first pattern) having a sinusoidal-wave-shaped luminance variation is arranged in the vertical direction (first direction). A symbol 2303 (second pattern), that is a waveform having information for identifying the position of the measurement-waveform 2302 on an object (described below), is arranged between the waves of the measurement-waveform 2302. The projection pattern 2301 is a monochromatic pattern. This means that the measurement-waveform 2302 and the symbol 2303 have the same color. The symbol 2303 according to the present exemplary embodiment is a monochromatic symbol having monochromatic gradation.

A projection pattern generation unit 403 functions as a projection pattern generation apparatus for generating data of the projection pattern 2301 to be projected on an object by the projector 402 according to certain rules (described below). FIG. 23A illustrates the projection pattern 2301. The camera 404 functions as an imaging unit for capturing an image of the object 401, on which the projection pattern 2301 is projected, to generate a captured image, and transmitting the captured image to a subsequent projection pattern extraction unit 405. The optical axis of the camera 404 and the optical axis of the projector 402 are in parallel, and arranged almost perpendicularly to the object 401.

Upon acquisition of the captured image transmitted from the camera 404, the projection pattern extraction unit 405 selectively extracts the measurement-waveform 2302 and the symbol 2303 in the projection pattern 2301 existing in the acquired captured image, and transmits them to a symbol detection unit 406 at a later stage.

Upon acquisition of the symbol 2303 transmitted from the projection pattern extraction unit 405, the symbol detection unit 406 decodes the acquired symbol 2303. Then, the symbol detection unit 406 detects a peak position of the symbol 2303 as information for calculating the absolute phase of the measurement-waveform 2302, and transmits the peak position to a phase calculation unit 407 (described below).

Upon acquisition of the peak position of the symbol 2303 transmitted from the symbol detection unit 406, the phase calculation unit 407 calculates an absolute phase of the measurement-waveform 2302 in areas between the peak positions of the measurement-waveform 2302 in the captured image based on the acquired peak position of the symbol 2303 and the captured image. An area where the symbol 403 exists exhibits a different luminance variation from a luminance variation in the measurement-waveform 402. For such an area, the phase calculation unit 407 switches phase calculation depending on the presence or absence of the symbol 403. Further, the phase calculation unit 407 acquires the position of the projection pattern 2301 in the captured image based on the calculated absolute phase, and transmits the position to the three-dimensional shape calculation unit 408.

The three-dimensional shape calculation unit 408 acquires the position of the projection pattern 2301 in the captured image transmitted from the phase calculation unit 407. Then, by using the acquired position of the projection pattern 2301 and a previously-acquired positional relation between the projector 402 and the camera 404, the three-dimensional shape calculation unit 408 calculates the depth from the camera 404 to the object 401, i.e., a three-dimensional shape, in the captured image.

Processing performed by the three-dimensional shape measuring apparatus according to the present exemplary embodiment will be described below with reference to FIG. 24.

In step S2401, the projection pattern generation unit 403 illustrated in FIG. 22 generates data of the projection pattern 2301 illustrated in FIG. 23A according to the following rules.

Figure 23B:
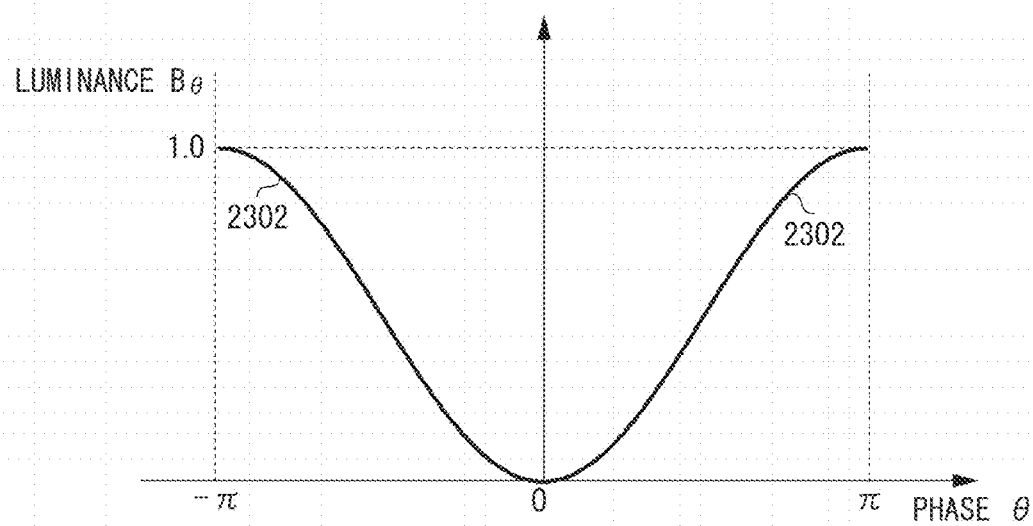

The projection pattern 2301 is a monochromatic pattern including a measurement-waveform 2302 having a continuous sinusoidal-wave-shaped luminance variation repetitively arranged at certain distances in the vertical direction, and a symbol 2303 (as a reference position) superimposed between the waves of the measurement-waveform 2302. Although, in the present exemplary embodiment, a waveform periodically changing in the vertical direction is used as the measurement-waveform 2302, for example, the measurement-waveform configuration is not limited thereto. However, the present exemplary embodiment utilizes the principle of triangulation, and therefore cannot be applied to a case where the measurement-waveform 2302 has a luminance variation in the direction perpendicular to a straight line formed by the principal point of the camera 404 and the principal point of the projector 402. FIG. 23B illustrates a variation in the luminance B when the direction of the luminance variation is set to the horizontal axis, the peak position of the measurement-waveform 2302 is set to the relative phase −π, and the adjacent lower peak position is set to the relative phase π. FIG. 23C illustrates a variation in the luminance B in an area where the symbol 2303 exists between the measurement-waveforms 2302.

The symbol 2303 has a luminance variation different from the unit waveform of the measurement-waveform 2302 so that the symbol 2303 can be distinguished from the measurement-waveform 2302. In the present exemplary embodiment, the symbol 2303 has a Gaussian functional waveform centering on the origin O having a steeper luminance variation. A difference in luminance variation caused by the presence or absence of the symbol 2303 is detected in a step (described below), and used as a reference position for absolute phase calculation. An area where the symbol 2303 exists also exhibits a continuous luminance variation having a mountain shape. For such an area, the phase calculation unit 407 switches phase calculation (described below) depending on the presence or absence of the symbol 2303.

In step S2402, the projector 402 projects the projection pattern 2301 illustrated in FIG. 23A (generated in step S2401) onto the object 401.

In step S2403, the camera 404 captures an image of the object 401, on which the projection pattern 2301 is projected by the projector 402, to generate a captured image, and transmits the captured image to the projection pattern extraction unit 405 at a later stage.

Figure 25:
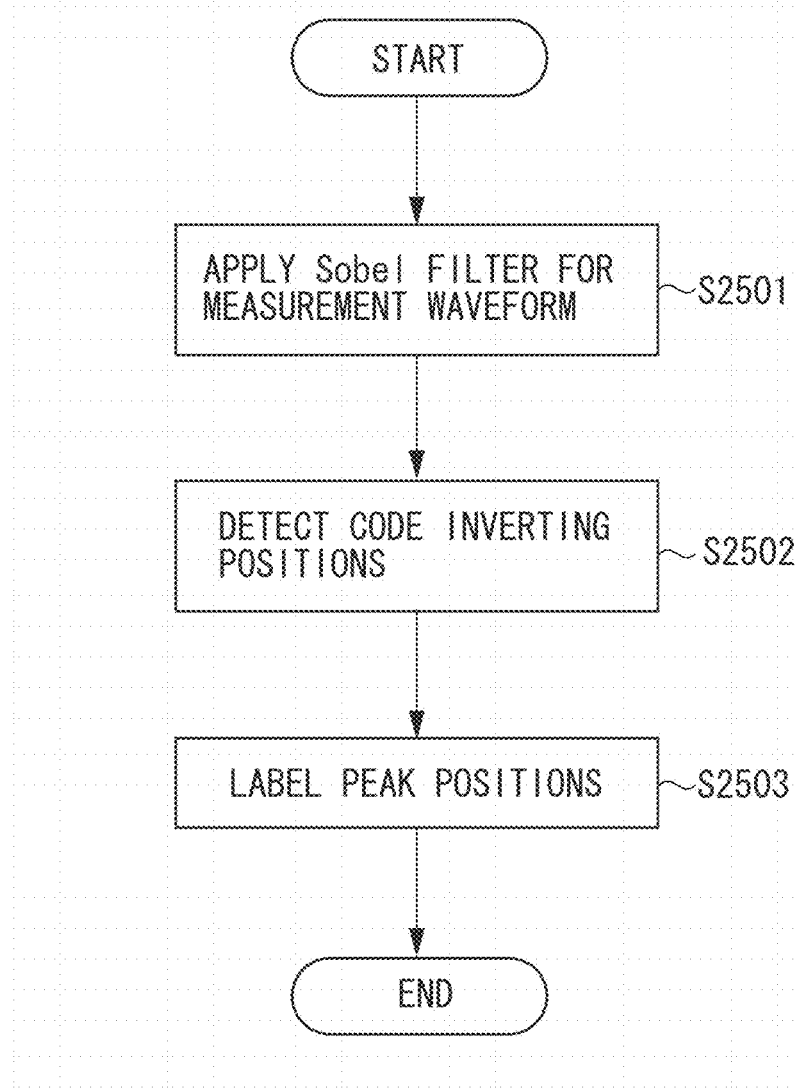
FIG. 25 is a flowchart illustrating processing in step S2404 according to the fourth exemplary embodiment.

In step S2404, the projection pattern extraction unit 405 selectively extracts a measurement-waveform peak curve formed of the measurement-waveform 2302 of the projection pattern 2301 existing in the captured image transmitted from the camera 404. Processing in step S2404 will be described in detail below with reference to the flowchart illustrated in FIG. 25.

Figure 26:
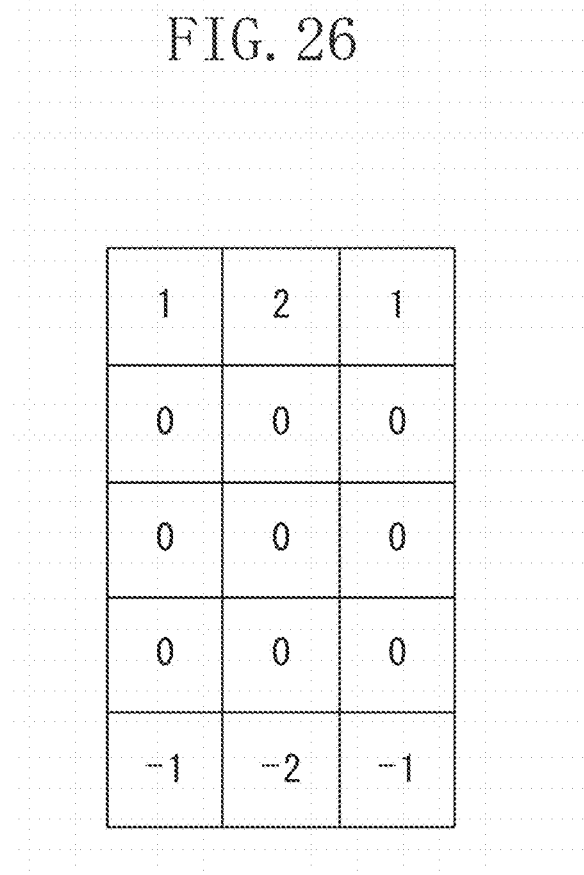
FIG. 26 illustrates a Sobel filter used for measurement-waveform detection according to the fourth exemplary embodiment.

In step S2501, the projection pattern extraction unit 405 applies Sobel filtering for measurement-waveform performing a differential action in the vertical direction on the captured image (transmitted from the camera 404) to generate a measurement-waveform Sobel filter image. The Sobel filter is a kind of convolution filter. The present exemplary embodiment employs a filter having a 3×5 matrix size, as illustrated in FIG. 26.

The vertical width of the filter is set to obtain a maximum contrast which a gap between the measurement-waveforms 2302 allows in the captured image, however it may be set to other optimum values depending on the gap between the measurement-waveforms 2302. Of course, the processing for generating a differential image of a captured image is not limited thereto. It is also possible to generate a differential image of a captured image with other methods.

In step S2502, the projection pattern extraction unit 405 scans the measurement-waveform Sobel filter image (acquired in step S2501) to detect positions where the sign of the pixel value is inverted, as measurement-waveform peak positions. The following describes detailed procedures for obtaining measurement-waveform peak positions based on a measurement-waveform Sobel filter image.

In the following descriptions, when a measurement-waveform Sobel filter image is denoted as $I_v$ and the value at a scanning position x is denoted as $I_v(x)$, the scanning direction is set as the direction almost perpendicular to measurement-waveform 2302, as illustrated in FIG. 7. When the pixel value of a pixel at the coordinate position currently being referred to on a target line is larger than a threshold value T, the coordinate position is $x_t$. Specifically, the projection pattern extraction unit 405 scans the measurement-waveform Sobel filter image in the scanning direction to detect a measurement-waveform detection start position $x_t$ exceeding a measurement line threshold $T_m$, as illustrated in the formula (17).

$$I_v(x_t) > T_m \qquad \text{Formula 17}$$

FIG. 8 illustrates a part of pixel groups constituting the target line. Each pixel in a section 802 has a noise and a pixel value effected by horizontal line pattern distortion caused by the object 401. Each pixel in a section 801 is a pixel equivalent to the position where a mountain-shaped portion of the measurement-waveform 2302 exists. As described above, Xt indicates a coordinate position which satisfies the above-described formula (17).

This threshold value processing eliminates the noise and the effect of a minute value in the section 802 due to horizontal line pattern distortion caused by the object 401, enabling accurately detecting the rising portion 803 produced by the measurement-waveform 2302 from the captured image.

Then, the projection pattern extraction unit 405 scans the position $x_0$ which satisfies the following formula (18), starting with the position $x_t$.

$$I_v(x_0)=0 \qquad \text{Formula 18}$$

The position $x_0$ satisfying the formula (18) indicates the position of the center of gravity where the luminance of the measurement-waveform 402 locally reaches a peak, as illustrated in FIG. 8. The projection pattern extraction unit 405 acquires the coordinates position $x_0$ as a measurement-waveform peak point $c_m$ (m=1, 2, 3, . . . , $m_{max}$).

The projection pattern extraction unit 405 repeats the above-described scanning processing for all of the positions x in the measurement-waveform Sobel filter image $I_v$ to acquire all of the measurement-waveform peak points $c_m$ in the measurement-waveform Sobel filter image $I_v$ as a measurement-waveform peak point group C. Then, the projection pattern extraction unit 405 transmits the measurement-waveform group C obtained through the above-described processing to the phase calculation unit 407 at the later stage.

In step S2503, the projection pattern extraction unit 405 groups proximal points in the measurement-waveform peak point group C (acquired in step S2502), and labels each group as a single area $L_n$ (n=1, 2, 3, . . . ). If the number of measurement-waveform peak points $c_m$ of a group is equal to or less than the threshold value $N_c$, the projection pattern extraction unit 405 regards the relevant group as a noise, and hence does not label the group.

By the above-described labeling, mis-detection due to the noise and a luminance variation of the symbol 2303 can be satisfactorily eliminated, and a measurement-waveform peak curve $L_n$ which is a curved area can be selectively extracted.

By performing the above-described processing of selectively extracting, in step S2404, measurement-waveform peak curves $L_n$ formed by the measurement-waveform 402 based on the captured image (acquired in step S2503) can be selectively extracted.

Returning to FIG. 24, in step S2405, the symbol detection unit 406 detects positions of the symbols 2303 based on the captured image transmitted from the camera 404.

Processing in step S2405 will be described in detail below with reference to the flowchart illustrated in FIG. 27.

In step S2701, the symbol detection unit 106 applies to the captured image (which is transmitted from the camera 104) Sobel filtering for the symbol 2303 performing a differential action in the vertical direction, to generate a symbol Sobel filter image. Step S2701 performs similar processing to step S401 by using a symbol Sobel filter having a 3×3 matrix size, as illustrated in FIG. 6. The vertical width of the filter is set to obtain a maximum contrast with a luminance variation of the symbol 403 in the captured image, however, it may be set to other optimum values depending on the shape of the symbol 403. Of course, the processing for generating a differential image of a captured image is not limited thereto. It is also possible to generate a differential image of a captured image with other methods.

In step S2702, the symbol detection unit 406 scans the symbol Sobel filter image (acquired in step S2701) to detect as a symbol detection start position $x_b$ a point which is maximized in each scanning line and exceeds a symbol threshold value $T_b$.

In step S2703, the symbol detection unit 406 scans the symbol Sobel filter image (acquired in step S2701) starting from the symbol detection start position xb (obtained in step S2702), to detect a first position where the sign of the value is inverted, as a symbol peak position.

In this case, the symbol detection unit 406 performs calculation by using the symbol Sobel filter image instead of the measurement-waveform Sobel filter image $I_v$, and the symbol detection start position xb instead of the measurement-waveform detection start position $x_t$. As a result of this calculation, the symbol detection unit 406 acquires as a symbol peak point $b_n$ (n=1, 2, 3, . . . , $n_{max}$) up to one position $x_0$ existing in units of scanning lines. Then, the symbol detection unit 406 labels as a symbol peak point group B all of the symbol peak points $b_n$ in the symbol Sobel filter image.

By performing the above operation, the symbol peak point group B (the position of the symbol 2303) can be acquired based on the captured image.

In step S2406, the phase calculation unit 407 scans the captured image (transmitted from the camera 404) with a scanning line $S_y$ (y=1, 2, 3, . . . , $y_{max}$). Processing in subsequent steps is performed in units of scanning pixels $p_{xy}$ constituting each scanning line $S_y$ in the captured image.

In step S2407, the phase calculation unit 407 determines whether the position of the scanning pixel $p_{xy}$ exists in a single phase of the symbol 2303 illustrated in FIG. 23A. Depending on the result of the determination, processing proceeds to step S2408 or S2409.

Specifically, the phase calculation unit 407 searches for two adjacent pixels on the same scanning line $S_y$, starting with the scanning pixel $p_{xy}$, to detect a measurement-waveform peak point $c_m$ and a symbol peak $b_n$.

When a measurement-waveform peak point $c_m$ is first detected or no point is detected as both of the two adjacent pixels (NO in step S2407), the phase calculation unit 407 determines that the scanning pixel $p_{xy}$ exists outside a single phase of the symbol 2303, and the processing proceeds to step S2408. Otherwise, when a symbol peak point $b_n$ is first detected as either one of the two adjacent pixels (YES in step S2407), the phase calculation unit 407 determines that the scanning pixel $p_{xy}$ exists in a single phase of the symbol 2303, and the processing proceeds to step S2409.

In step S2408, the phase calculation unit 407 performs phase calculation for the scanning pixel $p_{xy}$ existing outside a single phase of the symbol 2303 to acquire the vertical positions $Y_{xy}$ equivalent to the absolute phase in the projection pattern 2301.

Processing in step S2408 will be described in detail below with reference to the flowchart illustrated in FIG. 28.

In step S2801, the phase calculation unit 407 sets an area enclosed by measurement-waveform peak points $c_m$ on the same y-coordinate value as a search area $A_{pxy}$, starting with the scanning pixel $p_{xy}$.

In step S2802, the phase calculation unit 407 searches for a pixel having a smallest luminance value as a minimum luminance pixel $p_{min}$ in the search area $A_{pxy}$ (set in step S2801) to acquire a minimum luminance $B_{min}$.

In step S2803, the phase calculation unit 407 assigns a luminance $B_{up}$ of the upper end pixel, a luminance $B_{down}$ of a lower end pixel, and the minimum luminance $B_{min}$ in the search area $A_{pxy}$ to the following formulas (19) and (20) to convert the luminance value $B_{xy}$ of the scanning pixel $p_{xy}$ into a normalized luminance $B_{nxy}$.

When the y-coordinate value of $p_{xy}$ in the captured image is larger than the y-coordinate value of $p_{min}$ ($y_{pxy} > y_{pmin}$)

$$B_{nxy} = \frac{B_{xy} - B_{min}}{B_{up} - B_{min}} \quad \text{Formula 19}$$

When the y-coordinate value of $p_{xy}$ in the captured image is equal to or less than the y-coordinate value of $p_{min}$ ($y_{pxy} \leq y_{pmin}$)

$$B_{nxy} = \frac{B_{xy} - B_{min}}{B_{down} - B_{min}} \quad \text{Formula 20}$$

In step S2804, the phase calculation unit 407 acquires the vertical position $Y_{pxy}$ equivalent to the absolute phase of the scanning pixel $p_{xy}$ in the projection pattern 2301.

First, in the normalized luminance $B_{nxy}$ obtained in step S2803, the surface color of the object is constant within the range of the search area $A_{pxy}$.

Within the phase range from $-\pi$ to 0 where $y_{pxy} > y_{pmin}$ is satisfied, the normalized luminance $B_{nxy}$ indicates a relative phase based on the sinusoidal value multiplied by $-1$ when the phase of the upper end pixel in the search area $A_{pxy}$ is set to $-\pi$ and the phase of the minimum luminance pixel $p_{min}$ therein is set to 0. Therefore, the relative phase value $\theta_{pxy}$ [rad] of the scanning pixel $p_{xy}$ existing at a position within the phase range from $-\pi$ to 0 is represented by the following formula (21).

When the y-coordinate value of $p_{xy}$ in the captured image is larger than $p_{min}$ ($y_{pxy} > y_{pmin}$, $-\pi \leq \theta_{pxy} \leq 0$)

$$\theta_{pxy} = -\sin^{-1} B_{nxy} \quad \text{Formula 21}$$

Likewise, within the phase range from 0 to $\pi$ where $y_{pxy} \leq y_{pmin}$ is satisfied, the relative phase value $\theta_{pxy}$ indicates a phase value based on the sinusoidal value when the phase of the lower end pixel in the search area $A_{pxy}$ is set to $\pi$ and the phase of the minimum luminance pixel $p_{min}$ therein is set to 0. Therefore, the relative phase value $\theta_{pxy}$ [rad] of the scanning pixel $p_{xy}$ existing at a position within the phase range from 0 to $\pi$ [rad] is represented by the following formula (22).

When the y-coordinate value of $p_{xy}$ in the captured image is equal to or less than $p_{min}$ ($y_{pxy} \leq y_{pmin}$, $0 < \theta_{pxy} < \pi$)

$$\theta_{pxy} = \sin^{-1} B_{nxy} \quad \text{Formula 22}$$

Based on the above-described relative phase value $\theta_{pxy}$, the vertical position $Y_{pxy}$ of the scanning pixel $p_{xy}$ on the projection pattern 2301 is represented by the following formula (23).

$$Y_{pxy} = Y_0 + Y_{phase}\left(W + \frac{\theta_{pxy}}{2\pi}\right) \quad \text{Formula 23}$$

Y0 indicates the vertical position of the symbol 2303 on the projection pattern 2301. $Y_{phase}$ indicates the unit width equivalent to a single phase between measurement-waveform peaks on the projection pattern 2301. $\pi$ indicates the circular constant, and W indicates the number of measurement-waveform peak points $c_m$ existing between the symbol peak point $b_n$ and the scanning pixel $p_{xy}$ existing on the scanning line $S_y$.

By performing the above-described operations, phase calculation for the scanning pixel $p_{xy}$ can be performed to acquire the vertical position Yxy equivalent to the absolute phase in the projection pattern 2301 in step S2408.

In step S2409, the phase calculation unit 407 performs phase calculation for the scanning pixel $p_{xy}$ existing in a single phase of the symbol 2303 to acquire the vertical positions Yxy equivalent to the absolute phase in the projection pattern 2301.

The procedures in step S2409 are almost similar to those in step S2408 illustrated in FIG. 28. However, since detailed operations are different, the processing in step S2409 will be described below with reference to the step number of the flowchart illustrated in FIG. 28.

In step S2801, the phase calculation unit 407 sets as a search area $A_{pxy}$ an area which is enclosed by the measurement-waveform peak points $c_m$ on the same y-coordinate value, and includes the symbol peak point $b_n$, starting with the scanning pixel $p_{xy}$.

In step S2802, the phase calculation unit 407 searches for a minimum luminance pixel $p_{min1}$ at positions above the y-coordinate value ($y_{bn}$) of the captured image at which the symbol peak point $b_n$ exists, in the search area $A_{pxy}$ (set in step S2801). Likewise, the phase calculation unit 407 searches for a minimum luminance pixel $p_{min1}$ at positions below the y-coordinate value ($y_{bn}$) of the captured image at which the symbol peak point $b_p$ exists, in the search area $A_{pxy}$ (set in step S2801). Then, the phase calculation unit 407 acquires respective minimum luminances $B_{min1}$ and $B_{min2}$.

In step S2803, the phase calculation unit 407 convert the luminance value $B_{xy}$ of the scanning pixel $p_{xy}$ into a normalized luminance $B_{nxy}$ by using the luminance $B_{up}$ of the upper end pixel, the luminance $B_{down}$ of the lower end pixel, a luminance $B_{bn}$ of the symbol peak point $b_n$, and the minimum luminances $B_{min1}$ and $B_{min2}$ in the search area $A_{pxy}$.

When the y-coordinate value of $p_{xy}$ in the captured image is larger than the y-coordinate value of $p_{min1}$ ($y_{pxy} > y_{pmin1}$)

$$B_{nxy} = \frac{B_{xy} - B_{min1}}{B_{up} - B_{min1}} \quad \text{Formula 24}$$

When the y-coordinate value of $p_{xy}$ in the captured image is equal to or less than the y-coordinate value $p_{min}$, and larger than the y-coordinate value of $b_n$ ($y_{bn} < y_{pxy} \leq y_{pmin1}$)

$$B_{nxy} = \frac{B_{xy} - B_{min1}}{B_{bn} - B_{min1}} \quad \text{Formula 25}$$

When the y-coordinate value of $p_{xy}$ in the captured image is equal to or less than the y-coordinate value of $b_n$, and larger than the y-coordinate value of $p_{min2}$ ($y_{min2} < y_{pxy} \leq y_{bn}$)

$$B_{nxy} = \frac{B_{xy} - B_{min2}}{B_{bn} - B_{min2}} \quad \text{Formula 26}$$

When the y-coordinate value of $p_{xy}$ in the captured image is equal to or less than the y-coordinate value of $p_{min2}$ ($y_{pxy} \leq y_{pmin2}$)

$$B_{nxy} = \frac{B_{xy} - B_{min2}}{B_{down} - B_{min2}} \qquad \text{Formula 27}$$

In step S2804, the phase calculation unit 407 calculates a relative phase of the scanning pixel $p_{xy}$ to acquire the vertical position $Y_{pxy}$ equivalent to the absolute phase in the projection pattern 2301, with reference to the position of the symbol peak point $b_n$. On the premise that the surface color of the object is constant within the range of the search area $A_{pxy}$, the normalized luminance $B_{nxy}$ obtained in step S2803 equals the luminance value of a luminance function $B_t=F(\theta)$ in the search area $A_{pxy}$ including the symbol 2303 of the projection pattern 2301, as illustrated in FIG. 23C. Therefore, the relative phase value $\theta_{Qpq}$ [rad] is represented by the following formula (28).

$$\theta_{pxy} = F^{-1}(B_{pxy}) \qquad \text{Formula 28}$$

Figure 29A:
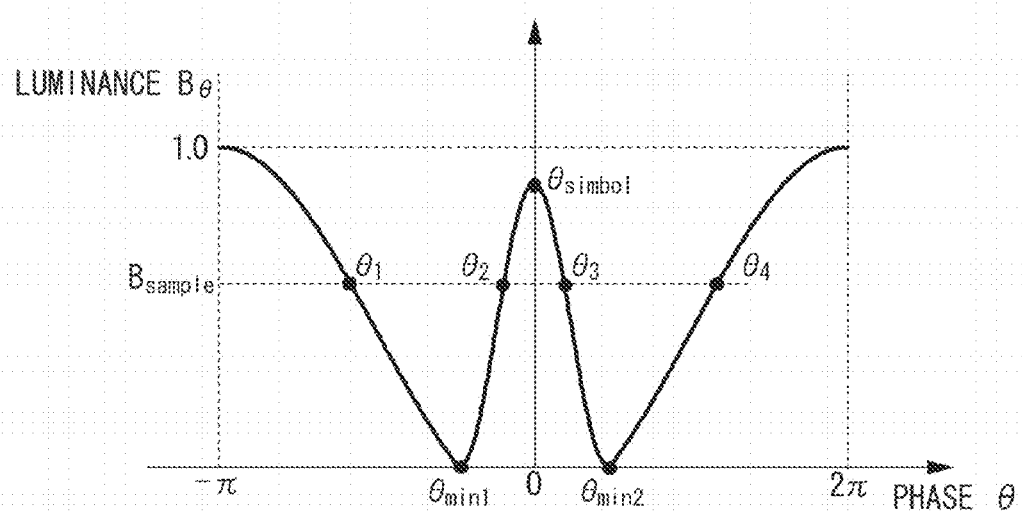
FIGS. 29A and 29B shows that θ is not uniquely determined when a luminance function luminance $B_{sample}$ according to the fourth exemplary embodiment is taken.
Figure 29B:
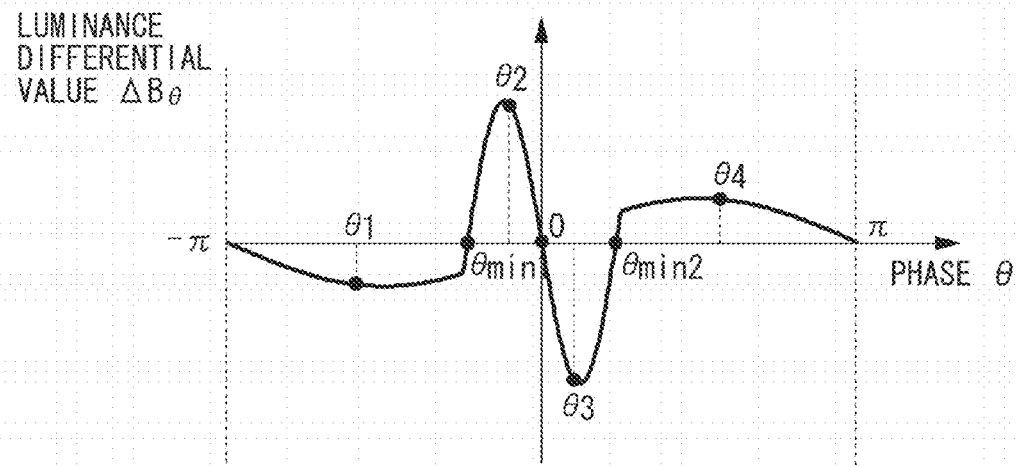

When $\pi \le \theta_{pxy} < \pi$, by preacquiring the luminance function $B_t = F(\theta)$ from the projection pattern 2301, prestoring the luminance function, and assigning the normalized luminance $B_{nxy}$ to the formula (28), the relative phase value $\theta_{Qxy}$ can be obtained. However, as illustrated in FIG. 29A, when an arbitrary luminance $B_{sample}$ is assigned $B_{nxy}$, the relative phase value cannot be uniquely determined, i.e., there are four different solution candidates $\theta_1$, $\theta_2$, $\theta_3$, and $\theta_4$. Therefore, the luminance differential function $\Delta B_t = F'(\theta)$, as illustrated in FIG. 29B, is used to determine the position of $\theta_{pxy}$. Specifically, the phase calculation unit 107 determines the position of $\theta_{pxy}$ based on the sign of the differential value of the scanning pixel $p_{xy}$, and a positional relation of the y position $y_{simbol}$ to the symbol peak $b_n$ on the captured image by using the following formula (29).

$$\begin{cases} \theta_{pxy} \le \theta_{min1}(\Delta B_t \le 0 \cap y_{pxy} \le y_{simbol}) \\ \theta_{min1} < \theta_{pxy} \le 0(\Delta B_t > 0 \cap y_{pxy} \le y_{simbol}) \\ 0 < \theta_{pxy} \le \theta_{min2}(\Delta B_t \le 0 \cap y_{pxy} > y_{simbol}) \\ \theta_{pxy} > \theta_{min1}(\Delta B_t > 0 \cap y_{pxy} > y_{simbol}) \end{cases} \qquad \text{Formula 29}$$

$\theta_{min1}$ indicates a relative phase value which provides the minimum luminance $B_{min1}$ in an area sandwiched between the symbol 2303 and the upper measurement-waveform 402 on the y coordinates existing in the projection pattern 2301. Likewise, $\theta_{min2}$ indicates a relative phase value which provides the minimum luminance $B_{min2}$ in an area sandwiched between the symbol 2303 and the lower measurement-waveform 2302 on the y coordinates existing in the projection pattern 2301.

As described above, even pixels having the same luminance value have different signs of the $\Delta B_t$ and different positional relations with the symbol 2303. Therefore, by performing the determination based on the formula (29), the relative phase value $\theta_{pxy}$ can be uniquely calculated.

The vertical position $Y_{pxy}$ of the scanning pixel Pxy on the projection pattern 2301 is similarly represented by the formula (7) based on the relative phase value $\theta_{pxy}$, and the number W of measurement-waveform peak points $c_m$ existing between the symbol peak point $b_n$ on the scanning line $S_y$ and the scanning pixel $p_{xy}$.

By performing calculation based on the formula (7), the vertical position $Y_{pxy}$ of the scanning pixel $p_{xy}$ on the projection pattern 2301 can be obtained.

By performing the above-described operations, a phase calculation for the scanning pixel $p_{xy}$ can be made to acquire the vertical position Yxy equivalent to the absolute phase in the projection pattern 2301 in step S2409.

In step S2410, the three-dimensional shape calculation unit 408 calculates a three-dimensional shape of the object 401 by using the vertical position $Y_{pxy}$ of the scanning pixel $p_{xy}$ on the projection pattern 2301 obtained in steps S2408 and S2409. Processing in step S2410 is similar to the processing in step S409, and redundant descriptions will be omitted.

In step S2411, the three-dimensional shape calculation unit 408 determines whether scanning is completed for all of the scanning pixels $p_{xy}$ existing in the captured image 401. When scanning is completed (YES in step S2411), the processing according to the present exemplary embodiment ends. Otherwise, when scanning is not completed (NO in step S2411), the processing returns to step S2406 to repeat scanning.

By performing steps S2401 to S2411 in this way to apply the vertical position $Y_{pxy}$ on the projection pattern 2301 to the corresponded scanning pixel $p_{xy}$ in the captured image 401, a three-dimensional shape of the entire object can be obtained.

Thus, according to the present exemplary embodiment, it is possible to measure a three-dimensional shape of an object with high density and high accuracy based on a captured image of the object on which a monochromatic pattern is projected.

Still another desirable exemplary embodiment of the present invention will be described below.

The overall configuration of an image information processing apparatus according to a fifth exemplary embodiment is basically similar to the configuration according to the fourth exemplary embodiment illustrated in FIG. 22.

Figure 30A:
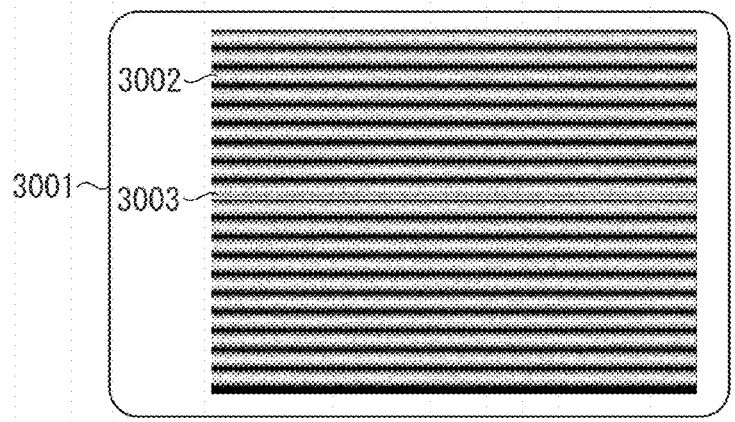
FIGS. 30A to 30C illustrate a projection pattern according to a fifth exemplary embodiment.

However, instead of the projection pattern 401, the projector 402 projects a projection pattern 3001 illustrated in FIG. 30A onto the object 401 to be measured.

The camera 404 functions as an imaging unit for capturing an image of the object 401 illustrated in FIG. 22, on which the projection pattern 3001 illustrated in FIG. 30A is projected, to generate a captured image, and transmitting the captured image to a subsequent projection pattern extraction unit 405.

Figure 24:
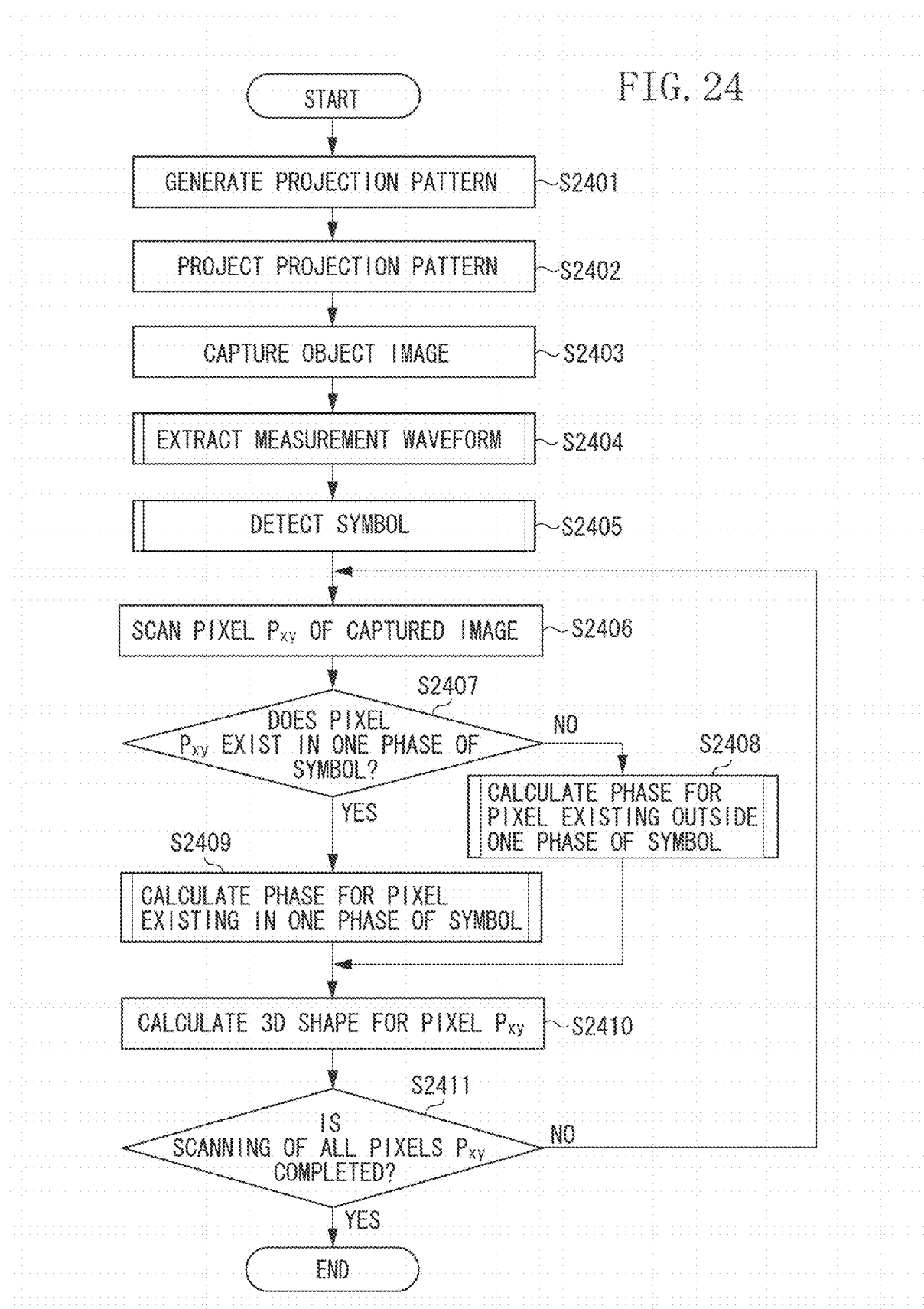
FIG. 24 is a flowchart illustrating processing according to the fourth exemplary embodiment.

The flowchart illustrating the processing according to the present exemplary embodiment is basically the same as the flowchart according to the third exemplary embodiment illustrated in FIG. 24.

However, the processing according to the present exemplary embodiment differs from the processing according to the third exemplary embodiment only in two different steps: step S2401 in which the projection pattern 3001 is generated, and step S2405 in which the symbol 3003 is detected. Processing according to the present exemplary embodiment will be described below with reference to the step number of each flowchart.

In step S2401, the projection pattern generation unit 403 generates data of the projection pattern 3001 illustrated in FIG. 30A according to the following rules.

Figure 30B:
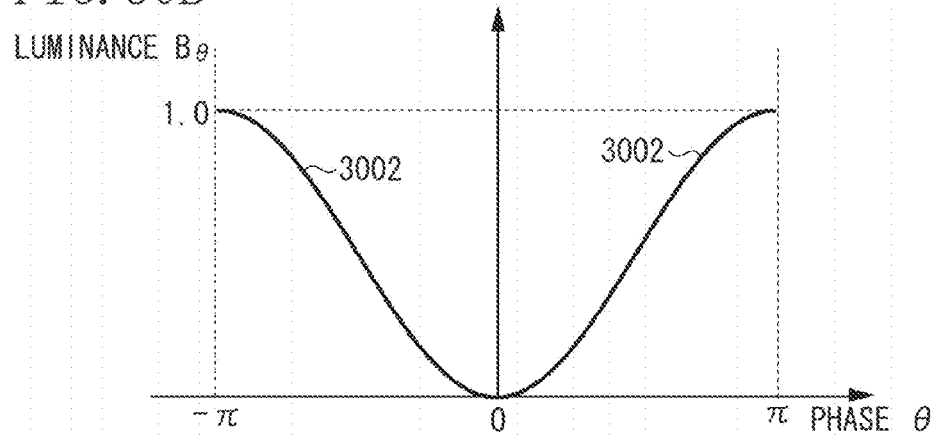
Figure 30C:
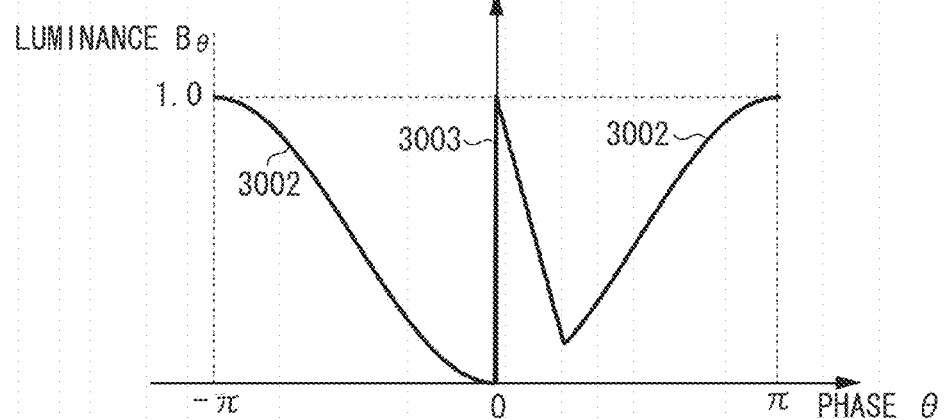

The projection pattern 3001 is a monochromatic pattern including a measurement-waveform 3002 having a continuous and periodical sinusoidal-wave-shaped luminance variation which is repetitively arranged in the vertical direction, and a symbol 3003 (as a reference position) superimposed between the waves of the measurement-waveform 3002. FIG. 30B illustrates a variation in the luminance B when the direction of the luminance variation is set to the horizontal axis, the peak position of the measurement-waveform 3002 is set to the relative phase $-\pi$, and the adjacent lower peak position is set to the relative phase $\pi$. FIG. 30C illustrates a variation in the luminance B in an area where the symbol 3003 exists between the measurement-waveforms 3002.

The symbol 3003 has a steepest luminance variation in the projection pattern 3001. The symbol detection unit 406 detects the symbol 3003 in step S2405, and uses the symbol 3003 as a reference position for calculating the absolute phase of the measurement-waveform 3002. An area where the symbol 3003 exists also exhibits a continuous luminance variation. In such an area, the phase calculation unit 407 switches phase calculation (described below) depending on the presence or absence of the symbol 3003 to make a depth calculation.

In step S2405, the symbol detection unit 406 detects the position of the symbol 3003 based on the captured image transmitted from the camera 404.

Processing in step S2405 will be described in detail below with reference to the flowchart illustrated in FIG. 31.

In step S3101, the symbol detection unit 406 applies to the captured image (acquired in step S2403) Sobel filtering for the symbol 3003 performing a differential action in the vertical direction, to generate a symbol Sobel filter image.

In step S3102, the symbol detection unit 406 scans the symbol Sobel filter image (acquired in step S3101) to detect as a symbol peak point $b_n$ a point which is maximized in each scanning line and exceeds a symbol threshold value $T_{bp}$. In the present exemplary embodiment, as illustrated in FIG. 30C, the luminance value exhibits a steep luminance variation at the position of the symbol peak point $b_n$, and the position providing a maximum value of luminance variation serves as the symbol peak point $b_n$ as it is. As a result, the symbol detection unit 406 acquires as a symbol peak point $b_n$ (n=1, 2, 3, ..., $n_{max}$) up to one position $x_0$ existing in units of scanning lines. Then, the symbol detection unit 406 labels as a symbol peak point group B all of the symbol peak points $b_n$ in the symbol Sobel filter image.

With the above-described procedures, the symbol detection unit 406 detects the position of the symbol 3003 based on the captured image.

Thus, according to the present exemplary embodiment, it is possible to measure a three-dimensional shape of an object with high density and high accuracy based on a captured image of the object on which a monochromatic pattern is projected.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-195085 filed Sep. 5, 2012, and No. 2012-195086 filed Sep. 5, 2012 which are hereby incorporated by reference herein in their entirety.

What is claimed is:

1. An information processing apparatus comprising:
an obtaining unit configured to obtain a captured image of the object on which a projection pattern is projected by a projection unit; and
a derivation unit configured to derive a three-dimensional shape of the object based on the captured image,
wherein the projection pattern projected on the object by the projection unit includes a first pattern where luminance values of pixels to form the first pattern continuously vary in a predetermined direction, and a second pattern having information for identifying the first pattern in the captured image in an area between peaks of the luminance value in the first pattern.

2. The information processing apparatus according to claim 1, wherein the first pattern is a monochrome pattern.

3. The information processing apparatus according to claim 1, wherein the derivation unit comprises:
a detection unit configured to detect the first pattern and the second pattern based on the captured image; and
a corresponding unit configured to correspond the first pattern in the projection pattern with the detected first pattern in the captured image based on the position of the detected second pattern,
wherein the derivation unit derives a three-dimensional shape of the object based on the result of the corresponded by the corresponding unit.

4. The information processing apparatus according to claim 3, wherein the second pattern is a coded code pattern, and
wherein the corresponding unit decodes the coded pattern to correspond the first pattern in the projection pattern with the detected first pattern in the captured image.

5. The information processing apparatus according to claim 3, wherein the second pattern is a symbol for identifying the position of the first pattern, and
wherein the corresponding unit corresponds the first pattern in the projection pattern with the detected first pattern in the captured image based on the position of the detected second pattern.

6. The information processing apparatus according to claim 3, further comprising a phase derivation unit configured to derive a phase of the corresponded first pattern.

7. The information processing apparatus according to claim 6, wherein, when the second pattern exists in an area between peaks in the first pattern, the phase derivation unit derives a phase for an area between peaks where a code pattern does not exist, in the captured image.

8. The information processing apparatus according to claim 6, wherein, when the second pattern exists in an area between peaks in the first pattern, the phase derivation unit performs phase calculation as a combined pattern of the first pattern and the second pattern as to an area between peaks where the second pattern exists, in the captured image.

9. The information processing apparatus according to claim 7, wherein, interpolation is performed on an area between peaks where the second pattern exists, based on the result of a three-dimensional shape derived for peripheral areas, in the captured image.

10. The information processing apparatus according to claim 1, wherein the first pattern has a sinusoidal-wave-shaped luminance variation.

11. The information processing apparatus according to claim 1, wherein the second pattern has a Gaussian functional luminance variation.

12. An information processing method comprising:
   obtaining a captured image of the object on which a projection pattern is projected by a projection unit; and
   deriving a three-dimensional shape of the object based on the captured image,
   wherein the projection pattern includes a first pattern where luminance values of pixels to form the first pattern continuously vary in a predetermined direction, and a second pattern having information for identifying the position of the first pattern in the captured image in an area between peaks of the luminance value in the first pattern.

13. A non-transitory computer-readable storage medium storing a program for causing a computer to execute an information processing method, wherein the information processing method comprises:
   obtaining a captured image of the object on which a projection pattern is projected by a projection unit; and
   deriving a three-dimensional shape of the object based on the captured image, wherein the projection pattern includes a first pattern where luminance values of pixels to form the first pattern continuously vary in a predetermined direction, and a second pattern having information for identifying the first pattern in the captured image in an area between peaks of the luminance value in the first pattern.

* * * * *